United States Patent
Pi et al.

(10) Patent No.: US 10,521,641 B2
(45) Date of Patent: Dec. 31, 2019

(54) SECURE HUMAN FINGERPRINT SENSOR

(71) Applicant: Shenzhen Goodix Technology Co., Ltd., Shenzhen (CN)

(72) Inventors: Bo Pi, San Diego, CA (US); Yi He, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/806,294

(22) Filed: Nov. 7, 2017

(65) Prior Publication Data

US 2018/0300530 A1    Oct. 18, 2018

Related U.S. Application Data

(62) Division of application No. 14/552,459, filed on Nov. 24, 2014, now Pat. No. 9,811,713.
(Continued)

(51) Int. Cl.
*G06K 9/00* (2006.01)
*H04L 29/06* (2006.01)
(Continued)

(52) U.S. Cl.
CPC ......... *G06K 9/00087* (2013.01); *G06F 21/32* (2013.01); *G06F 21/83* (2013.01);
(Continued)

(58) Field of Classification Search
CPC . H04L 63/0861; G06F 21/83; G06K 9/00053; G06K 9/0004; G06K 9/00087
See application file for complete search history.

(56) References Cited

U.S. PATENT DOCUMENTS 5,682,032 A   10/1997 Philipp
5,732,148 A    3/1998 Keagy et al.
(Continued)

FOREIGN PATENT DOCUMENTS

CN   1185065   6/1998
CN   1485789   3/2004
(Continued)

OTHER PUBLICATIONS

Supplementary European Search Report from corresponding EP Application No. 14866421 dated Mar. 23, 2017 (6 pages).
(Continued)

*Primary Examiner* — Ruiping Li
(74) *Attorney, Agent, or Firm* — Perkins Coie LLP

(57) ABSTRACT

Devices, systems, and techniques are provided for performing human fingerprint detection and authentication for authenticating a request to access a locked mobile device equipped with a fingerprint detection module. In one aspect, responsive to detecting a contact from an object with the fingerprint detection module, described technique can be used to determines whether the contact from the object is from human skin. When determined that the detected contact from the object is from human skin, a presence of a human fingerprint can be detected from the object making contact. The detected fingerprint data can be obtained from the object and compared against stored fingerprint profiles associated with an authorized user of the locked mobile device. Based on the comparing, the request to access the locked mobile device can be granted.

17 Claims, 19 Drawing Sheets

Related U.S. Application Data

(60) Provisional application No. 61/908,026, filed on Nov. 22, 2013, provisional application No. 62/031,833, filed on Jul. 31, 2014.

(51) Int. Cl.
  *G06F 21/32* (2013.01)
  *G06F 21/83* (2013.01)
(52) U.S. Cl.
  CPC ....... *G06K 9/0004* (2013.01); *G06K 9/00053* (2013.01); *H04L 63/0861* (2013.01)

(56) References Cited

U.S. PATENT DOCUMENTS

| | | |
|---|---|---|
| 5,796,827 A | 8/1998 | Coppersmith et al. |
| 5,914,701 A | 6/1999 | Gersheneld et al. |
| 6,011,859 A | 1/2000 | Kalnitsky et al. |
| 6,501,846 B1 | 12/2002 | Dickinson et al. |
| 6,771,161 B1 | 8/2004 | Doi et al. |
| 7,751,595 B2 | 7/2010 | Russo |
| 8,994,498 B2 | 3/2015 | Agrafioti et al. |
| RE45,601 E | 7/2015 | Dean et al. |
| 9,886,613 B2 | 2/2018 | Pi et al. |
| 2001/0025532 A1 | 10/2001 | Kramer |
| 2003/0055785 A1 | 3/2003 | Lahiri |
| 2003/0184430 A1 | 10/2003 | Kumar |
| 2005/0008197 A1 | 1/2005 | Dennis |
| 2005/0053264 A1 | 3/2005 | Amano et al. |
| 2005/0123177 A1 | 6/2005 | Abiko |
| 2005/0221798 A1 | 10/2005 | Sengupta et al. |
| 2005/0263596 A1 | 12/2005 | Nelson et al. |
| 2007/0232929 A1 | 10/2007 | Kilgore et al. |
| 2007/0299322 A1 | 12/2007 | Miyajima et al. |
| 2008/0122803 A1 | 5/2008 | Izadi et al. |
| 2009/0083847 A1 | 3/2009 | Fadell et al. |
| 2009/0083850 A1 | 3/2009 | Fadell et al. |
| 2009/0088197 A1 | 4/2009 | Stewart |
| 2009/0252384 A1 | 10/2009 | Dean et al. |
| 2009/0252386 A1 | 10/2009 | Dean et al. |
| 2010/0009658 A1 | 1/2010 | Wu |
| 2010/0148068 A1 | 6/2010 | Schwaneberg et al. |
| 2010/0201485 A1 | 8/2010 | Chou |
| 2010/0220900 A1 | 9/2010 | Orsley |
| 2011/0102346 A1 | 5/2011 | Orsley et al. |
| 2011/0102567 A1 | 5/2011 | Erhart |
| 2011/0227856 A1 | 9/2011 | Corroy et al. |
| 2011/0317886 A1 | 12/2011 | Matsuoka |
| 2012/0050988 A1 | 3/2012 | Rothkopf et al. |
| 2012/0090757 A1 | 4/2012 | Buchan et al. |
| 2012/0242635 A1 | 9/2012 | Erhart et al. |
| 2012/0258773 A1 | 10/2012 | Alvarez Rivera et al. |
| 2013/0097079 A1 | 4/2013 | Bruder |
| 2013/0108124 A1 | 5/2013 | Wickboldt et al. |
| 2013/0129162 A1 | 5/2013 | Cheng et al. |
| 2013/0129163 A1 | 5/2013 | Chung et al. |
| 2013/0169590 A1 | 7/2013 | Wickboldt et al. |
| 2013/0177220 A1 | 7/2013 | Erhart et al. |
| 2013/0181949 A1 | 7/2013 | Setlak |
| 2013/0194071 A1 | 8/2013 | Slogedal et al. |
| 2013/0211291 A1 | 8/2013 | Tran |
| 2013/0231046 A1 | 9/2013 | Pope et al. |
| 2013/0257804 A1 | 10/2013 | Vu et al. |
| 2013/0258086 A1 | 10/2013 | Erhart et al. |
| 2013/0259329 A1 | 10/2013 | Wickboldt et al. |
| 2013/0265137 A1 | 10/2013 | Nelson et al. |
| 2013/0307818 A1* | 11/2013 | Pope .................. G06F 3/044 345/174 |
| 2014/0002237 A1 | 1/2014 | Infante et al. |
| 2014/0093145 A1 | 4/2014 | Feekes |
| 2014/0103943 A1 | 4/2014 | Dunlap et al. |
| 2014/0139978 A1 | 5/2014 | Kwong |
| 2014/0268516 A1 | 9/2014 | Fathollahi et al. |
| 2014/0270413 A1* | 9/2014 | Slaby .................. G06F 3/0488 382/124 |
| 2014/0313154 A1 | 10/2014 | Bengtsson et al. |
| 2014/0333328 A1 | 11/2014 | Nelson et al. |
| 2015/0071509 A1 | 3/2015 | Myers |
| 2015/0146944 A1 | 5/2015 | Pi et al. |
| 2015/0149310 A1 | 5/2015 | He et al. |
| 2015/0169932 A1 | 6/2015 | Riedijk et al. |
| 2015/0185954 A1 | 7/2015 | Chang |
| 2015/0195007 A1 | 7/2015 | He et al. |
| 2015/0242675 A1 | 8/2015 | Pope et al. |
| 2015/0363629 A1 | 12/2015 | Lee et al. |
| 2016/0004899 A1 | 1/2016 | Pi et al. |
| 2016/0224816 A1 | 8/2016 | Smith et al. |
| 2016/0344767 A1 | 11/2016 | Baldwin et al. |

FOREIGN PATENT DOCUMENTS

| | | |
|---|---|---|
| CN | 1668245 | 9/2005 |
| CN | 102239655 | 11/2011 |
| CN | 102831410 | 12/2012 |
| CN | 103425965 | 12/2013 |
| CN | 105981039 | 9/2016 |
| EP | 1096722 | 5/2001 |
| EP | 1353292 B1 | 10/2011 |
| KR | 10-2011-0002373 | 1/2011 |
| KR | 10-1010344 | 1/2011 |
| KR | 10-2012-0124369 | 11/2012 |
| KR | 2012-0140016 A | 12/2012 |
| KR | 10-20130111464 | 10/2013 |
| WO | 0159692 | 8/2001 |
| WO | 2015/081326 A1 | 6/2015 |
| WO | 2016/007444 A1 | 1/2016 |

OTHER PUBLICATIONS

Extended European Search Report from corresponding EP Application No. 148643372 dated Jan. 31, 2017 (9 pages).
Korean Office Action from corresponding Korean Patent Application No. 10-2016-7015359 dated Jun. 24, 2017, (13 pages). (English translation not currently available).
Korean Office Action from corresponding Korean Patent Application No. 10-2016-7017169 dated Jan. 22, 2018, (8 pages). (English translation not currently available).
Korean Office Action from corresponding Korean Patent Application No. 10-2016-7027198 dated Aug. 2, 2017, (9 pages). (English translation not currently available).
Chinese Office Action from corresponding Chinese Patent Application No. 201480065208.X dated Feb. 1, 2018, (8 pages). (English translation not currently available).
Chinese Office Action from corresponding Chinese Patent Application No. 201580015697.2 dated Jul. 24, 2018, (11 pages). (English translation not currently available).
Chinese Office Action from corresponding Chinese Patent Application No. 201480064040.0 dated Oct. 17, 2018, (8 pages). (English translation not currently available).
ECMA International, "Near Field Communication—Interface and Protocol (NFCIP-1)," 52 pages, Jun. 2013.
International Search Report and Written Opinion dated Apr. 16, 2015 for International Application No. PCT/US2014/067828, filed on Nov. 28, 2014 (11 pages).
International Search Report and Written Opinion dated Mar. 10, 2015 for International Application No. PCT/US2014/067195, filed on Nov. 24, 2014 (8 pages).
International Search Report and Written Opinion dated Oct. 5, 2015 for International Application No. PCT/US2015/039273, filed on Jul. 6, 2015 (11 pages).
Chinese Office Action from corresponding Chinese Patent Application No. 201510012966.1 dated Apr. 1, 2019 (English translation not currently available).

* cited by examiner

SECURE HUMAN FINGERPRINT SENSOR

CROSS REFERENCE TO RELATED APPLICATIONS

This patent document is a divisional application of U.S. patent application Ser. No. 14/552,459, filed on Nov. 24, 2014, which claims the benefits and priorities of U.S. Provisional Patent Application No. 61/908,026, filed on Nov. 22, 2013 and U.S. Provisional Patent Application No. 62/031,833, filed on Jul. 31, 2014. The entire contents of the before-mentioned patent applications are incorporated by reference as part of the disclosure of this document.

TECHNICAL FIELD

The patent document relates to fingerprint recognition for securely accessing a mobile device.

BACKGROUND

Electronic devices including portable or mobile computing devices, such as laptops, tablets, smartphones, and gaming systems, may employ user authentication mechanisms to protect personal data and prevent unauthorized access. User authentication on an electronic device may be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern.

SUMMARY

Embodiments described in this document provide devices, systems, and techniques that perform human fingerprint detection and authentication for authenticating an access attempt to a locked mobile device equipped with a fingerprint detection module. In one aspect, a disclosed fingerprint detection system includes a touch sensing module which includes a touch sensor (such as a metal ring) and a sensor circuit for detecting an object making contact with fingerprint detection system; an optical sensor module including one or more light emitting sources and at least one photodetection element, a fingerprint pattern sensor, and an authentication processor. The touch sensing module is coupled to the optical sensor module. If the touch sensing module detects an object, such as a finger, the touch sensing module activates the optical sensor module, which then produces probe light at two or more different optical wavelengths to which a person's skin produces different optical responses at the two or more different optical wavelengths due to presence of blood in the person's skin. The optical sensor module also includes an optical detection unit that receives a reflection or transmission of the probe light to produce optical measurements of the probe light at the two or more different optical wavelengths. The optical measurements at different wavelengths can then be used to compute values that are compared to standard or calibrated values for human blood absorption to determine if the object is human skin. The computation, comparison, and determination operations can be performed by an on-chip signal processing unit integrated with the optical sensor module.

Moreover, the optical sensor module is coupled to the fingerprint pattern sensor. If the optical sensor module detects human skin as the object making contact, the optical sensor module activates the fingerprint pattern sensor, which includes a sensor array for gathering fingerprint data and a fingerprint pattern processor for determining whether the gathered fingerprint data resembles a human fingerprint. The fingerprint pattern sensor is coupled to an authentication processor. If the fingerprint pattern sensor detects a human fingerprint, the fingerprint pattern sensor activates the authentication processor. The authentication processor receives the gathered fingerprint data from the fingerprint pattern sensor and authenticates the gathered fingerprint data against stored fingerprint data of an authorized person's fingerprint pattern, and based on the verification outcome to generate authorization output to either grant or deny the access attempt.

In a high security operation mode, the authentication processor can also receive the optical measurements at the two or more optical wavelengths from the optical sensor module, and used the optical measurements to detect a human heartbeat signal. This heartbeat detection offers an additional check on whether a live person is associated with the detected human fingerprint. The authentication processor then generates an authorization decision based on both the result of fingerprint authentication and the result of heartbeat detection.

In one aspect, a technique for authenticating an access attempt to a locked mobile device equipped with a fingerprint detection module includes detecting whether an object is making contact with the fingerprint detection module. When determined that the object is making contact with the fingerprint detection module, the technique can be used to determine whether the object is human skin, and when determined that the object is human skin, the techniques can be used to further determine whether the object resembles human fingerprint associated with an access attempt. When a human fingerprint is confirm, the technique can be used to gather fingerprint data from the object; authenticate the gathered fingerprint data against stored fingerprint profiles; and grant or denying the access attempt based on the outcome of the gathered fingerprint authentication.

In another aspect, a technique for authenticating an access attempt to a locked mobile device equipped with a fingerprint detection module includes, in response to detection of an object making contact with the fingerprint detection module, determining whether the object is human skin. When determined that the object is human skin, the technique can be used to determine whether the object resembles human fingerprint associated with an access attempt. When human fingerprint is confirmed, the technique can be used to gather fingerprint data from the object and authenticating the gathered fingerprint data against stored fingerprint profiles. When the gathered fingerprint data is authenticated as a valid fingerprint, the technique can be used to determine whether the object is associated with a heartbeat signal. When determined that the object is associated with a heartbeat signal, the access attempt is granted. Otherwise, the access attempt is denied.

In another aspect, a technique for authenticating an access attempt to a locked mobile device equipped with a fingerprint detection module includes detecting whether an object is making contact with the fingerprint detection module. When determining that the object is making contact with the fingerprint detection module, the technique can be used to determine whether the object is human skin. When determined that the object is human skin, the technique can be used to gather fingerprint data from the object and authenticate the gathered fingerprint data against stored fingerprint profiles. When the gathered fingerprint data is authenticated as a valid fingerprint, the technique can be used to determine whether the object is associated with a heartbeat signal. When determined that the object is associated with a heartbeat signal, the access attempt is granted. Otherwise, the access attempt is denied.

In yet another aspect, a fingerprint detection module includes a substrate carrier and a fingerprint sensor chip located on the substrate carrier for collecting fingerprint data. The fingerprint detection module also includes a protective cover placed over the fingerprint sensor chip to protect the fingerprint sensor chip and a metal ring placed around the protective cover as a touch sensor to detect if an object is making contact with the fingerprint detection module. The fingerprint detection module additionally includes an optical detection module that contains: one or more light emitting sources located on the substrate carrier and underneath the protective cover; at least one photodetection element located on the substrate carrier and underneath the protective cover; and a signal processing circuit integrated with the fingerprint sensor chip. The fingerprint detection module further includes a colored layer coated on the bottom surface of the protective cover, wherein the colored layer contains micro-holes in a first region directly above the one or more light emitting sources and a second region directly above the at least one photodetection element to allow light to pass through the colored layer in the first region and the second region.

In yet another aspect, a fingerprint detection system includes a touch sensor which contains a metal ring for detecting an object making contact with the fingerprint detection module. The fingerprint detection system also comprises a fingerprint pattern sensor that includes a sensor array which reads a fingerprint pattern and a fingerprint pattern processor that determines whether the received fingerprint pattern matches stored information of an authorized person's fingerprint pattern to provide a fingerprint pattern authentication output. The fingerprint detection system additionally includes an optical sensor module that produces probe light at two or more different optical wavelengths to which a person's skin produces different optical responses at the two or more different optical wavelengths due to presence of blood in the skin, the optical sensor module including an optical detection unit that receives a reflection or transmission of the probe light to produce optical measurements of the probe light at the two or more different optical wavelengths. Moreover, the fingerprint detection system includes an authentication processor that receives the fingerprint pattern authentication output from the fingerprint pattern sensor and the optical measurements of the probe light at the two or more different optical wavelengths from the optical sensor module and to combine both the fingerprint pattern authentication output and optical measurements of the probe light to determine whether an access is to be granted or denied.

Various examples of fingerprint detection modules and fingerprint sensor modules described in this patent document can be integrated with mobile devices (e.g., smartphones, tablets, laptops), computing devices (e.g., personal computers), and other electronic devices to perform fingerprint authentication processes on these devices.

In yet another aspect, a method is provided for authenticating a request to access a locked mobile device equipped with a fingerprint detection module to include obtaining measurements of (1) a contact provided by a person and (2) a fingerprint input from the same person; determining whether the detected contact provided by the person is from a live person; comparing the fingerprint data from the obtained fingerprint input against one or more stored fingerprint profiles associated with an authorized user of the locked mobile device; and determining granting or denying the person's access based on both of (1) whether there is match in the fingerprint data and (2) whether the detected contact indicates the contact is from a live person.

The above and other aspects of the disclosed technology and their implementations and examples are described in greater detail in the drawings, the description and the claims.

DETAILED DESCRIPTION

Figure 1:
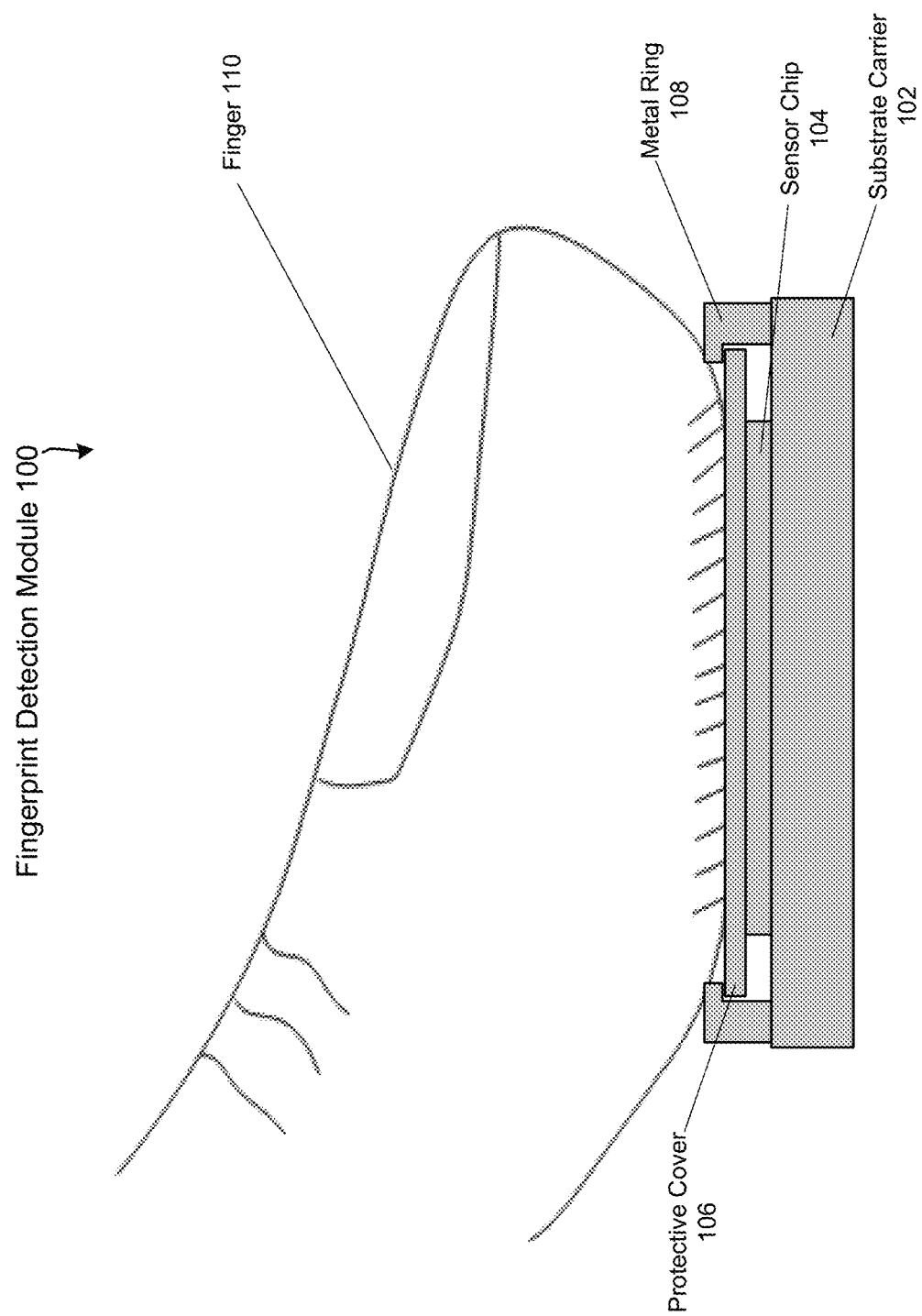
FIG. 1 shows a schematic of a cross-sectional view of a fingerprint detection module.

Electronic devices equipped with fingerprint authentication mechanisms may be hacked by malicious individuals who can obtain the authorized user's fingerprint, and copy the stolen fingerprint pattern on a carrier object that resembles a human finger, which can then be used to unlock the targeted device. Hence, the fingerprint pattern, although a unique biometric identifier, may not be by itself a completely reliable or secure identification. The techniques, devices and systems described in this document improve upon, or augment, a fingerprint authentication technology used in electronic devices by providing an additional sensing mechanism for determining whether the detected contact from the object is from a live person to potentially prevent a stolen fingerprint from being used to gain access to the targeted device.

In some embodiments, a touch sensing module that includes a touch sensor (e.g., implemented using a metal ring or other similar conductive materials and structures) placed around a fingerprint detection module on a mobile device and associated touch sensing circuitry communicatively coupled to the touch sensor can be used to detect a contact from an object with the touch sensor, such as the metal ring and the fingerprint detection module. The touch sensing module can be used to activate the fingerprint detection module and the mobile device in a power saving/standby mode with a light touch, without additional user input such as actuating a mechanical switch or button. However, in everyday uses when a user is holding or carrying (e.g., in a pocket close to the body) a mobile device, unintended and incidental contact the touch sensing module are common and can be difficult to avoid. It can be undesirable from power saving perspective if any contact by a finger or a part of the human body with the touch sensing module indiscriminately activates the fingerprint detection module and/or the mobile device in power saving/standby mode. Embodiments described in this document provide devices, systems, and techniques that enable light touch activations of fingerprint detection module while preventing or reducing unintended and incidental touches from activating the fingerprint detection module and/or the mobile device in a standby mode.

Embodiments described in this document provide devices, systems, and techniques that perform human fingerprint detection and authentication for authenticating a user requesting to gain access to a locked mobile device equipped with a fingerprint detection module. In one aspect, a fingerprint detection system includes a touch sensing module which includes a touch sensor (such as a metal ring) and a sensor circuitry for detecting an object making contact with the fingerprint detection system; an optical sensor module, a fingerprint pattern sensor, and an authentication processor. The touch sensing module is communicatively coupled to the optical sensor module. Responsive to the touch sensing module detecting a contact from an object, such as a finger, the touch sensing module activates the optical sensor module, which then produces probe light signals at two or more different optical wavelengths to which a person's skin produces different optical responses at the two or more different optical wavelengths due to presence of blood in the person's skin. The optical sensor module includes an optical detection unit that receives a reflection or transmission of the probe light signals to produce optical measurements of the probe light signals at the two or more different optical wavelengths. The optical measurements at different wavelengths can then be used to compute values that are compared to standard or calibrated values for human blood absorption to determine whether the detected contact from the object is from human skin. The computation, comparison, and determination operations can be performed by an on-chip signal processing unit integrated with the optical sensor module.

Moreover, the optical sensor module is coupled to the fingerprint pattern sensor. Responsive to the optical sensor module detecting that the contact is from human skin, the optical sensor module activates the fingerprint pattern sensor, which includes a sensor array for gathering fingerprint data and a fingerprint pattern processor for determining whether the gathered fingerprint data resembles a human fingerprint. The fingerprint pattern sensor is communicatively coupled to an authentication processor. Responsive to the fingerprint pattern sensor detecting a human fingerprint of a user requesting access to the locked mobile device, the fingerprint pattern sensor activates the authentication processor. The authentication processor receives the gathered fingerprint data from the fingerprint pattern sensor and attempts to authenticate the user by comparing the gathered fingerprint data against stored fingerprint data of an authorized user's fingerprint pattern. Based on the result of the attempted authentication, the authentication processor can generate an authorization decision to either grant or deny access to the locked mobile device.

In a high security operation mode, the authentication processor can also receive optical measurements at two or more optical wavelengths from the optical sensor module, and use the received optical measurements to detect a human heartbeat signal. The optical heartbeat detection can potentially offer an additional verification on whether a live user is associated with the detected human fingerprint. The authentication processor then generates an authorization decision based on both the result of the fingerprint comparison and the result of optical heartbeat detection.

In one aspect, a technique for authenticating a user requesting to gain access to a locked mobile device equipped with a fingerprint detection module includes detecting a contact from an object on the fingerprint detection module. Responsive to determining that the detected contact from the object is from human skin, the technique can be further used to determine whether the detected contact from human skin resembles contact from a human fingerprint associated with a user requesting to access the locked mobile device. Responsive to determining that the detected contact is from a human fingerprint, the technique can be used to obtain fingerprint data from the human skin. The obtained fingerprint data can be compared against stored fingerprint profiles in an attempt to authenticate the user, and user access to the locked mobile device can be granted when the obtained fingerprint matches one of the stored fingerprint profiles associated with an authorized user of the locked mobile device.

In another aspect, a technique for authenticating a user requesting access to a locked mobile device equipped with a fingerprint detection module includes, in response to detecting a contact from an object with the fingerprint detection module, determining whether the detected contact from the object is from human skin. Responsive to detecting the contact from human skin, the technique can be used to determine whether the detected contact from human skin resembles contact from human fingerprint associated with a user requesting an access to the locked mobile device. Responsive to determining that the contact is from human fingerprint, the technique can be used to obtain fingerprint data from the human fingerprint and attempt to authenticate the user by comparing the obtained fingerprint data against stored fingerprint profiles of an authorized user. Responsive to matching the obtained fingerprint data with stored fingerprint profiles of an authorized user, the technique can be used to subsequently determine whether the detected object is associated with a heartbeat signal. Responsive to associating a heartbeat with the detected object, user access is granted. Otherwise, the access attempt is denied.

In another aspect, a technique for authenticating a user requesting access to a locked mobile device equipped with a fingerprint detection module includes detecting a contact from an object with the fingerprint detection module. Responsive to detecting the contact, the technique can be used to determine whether the contact from the object is from human skin. Responsive to detecting contact from human skin, the technique can be used to obtain fingerprint data from the human skin and compare the obtained fingerprint data against stored fingerprint profiles of an authorized user. Responsive to finding a match between the obtained fingerprint data and the stored fingerprint profiles of an authorized user, the obtained fingerprint is identified as a valid fingerprint of an authorized user. The technique can be used to subsequently determine whether the object making contact is associated with a heartbeat signal. Responsive to detecting a heart beat signal from the human skin having a fingerprint, the user access is granted. In absence of both fingerprint detection and heartbeat detection, the user access attempt is denied.

In yet another aspect, a fingerprint detection module includes a substrate carrier and a fingerprint sensor chip located on the substrate carrier for collecting fingerprint data. The fingerprint detection module also includes a protective cover placed over the fingerprint sensor chip to protect the fingerprint sensor chip and a touch sensor placed around the protective cover to detect a contact from an object with the fingerprint detection module. The touch sensor can be made of a conductive material that borders at or near an outline of the protective cover and can be shaped to conform with the outline of the protective cover. For a round protective cover, the touch sensor can be a metal ring for example. For a rectangular protective cover, the touch sensor can be a metal rectangular frame for another example. Also, the fingerprint detection module includes an optical detection module that contains: one or more light emitting sources located on the substrate carrier and underneath the protective cover; at least one photodetection element located on the substrate carrier and underneath the protective cover; and a signal processing circuit integrated with the fingerprint sensor chip. In addition, the fingerprint detection module includes a colored layer coated on the bottom surface of the protective cover. The colored layer contains micro-holes in a first region directly above the one or more light emitting sources and a second region directly above the at least one photodetection element to allow light to pass through the colored layer in the first region and the second region.

In yet another aspect, a fingerprint detection system includes a touch sensor such as a metal ring to detect a contact from an object with the fingerprint detection module. Also, the fingerprint detection system includes a fingerprint pattern sensor to detect a fingerprint pattern. The fingerprint patter sensor can be implemented using a sensor array, for example. The fingerprint detection system can include a fingerprint pattern processor to determine whether the detected fingerprint pattern matches stored information of an authorized person's fingerprint pattern to provide a fingerprint pattern authentication output. Also, the fingerprint detection system includes an optical sensor module to produce probe light signals at two or more different optical wavelengths to which a user's skin produces different optical responses at the two or more different optical wavelengths due to the presence of blood in the skin. The optical sensor module includes an optical detection unit to receive a reflection or transmission of the probe light signals to produce optical measurements of the probe light signals at the two or more different optical wavelengths. Moreover, the fingerprint detection system includes an authentication processor to receive the fingerprint pattern authentication output from the fingerprint pattern sensor and the optical measurements of the probe light signals at the two or more different optical wavelengths from the optical sensor module. The fingerprint detection system can combine both the fingerprint pattern authentication output and optical measurements of the probe light signals to determine whether an access is to be granted or denied.

Embodiments described in this document provide devices, systems, and techniques that implement various fingerprint detection modules for human fingerprint detection and authentication. Moreover, embodiments described in this document provide devices, systems, and techniques that implement various fingerprint detection modules including an optical sensing unit to determine if a detected object is human. Specifically, the technology disclosed in this document uses an additional measurement or sensing mechanism to make another measurement beyond the fingerprint sensing obtained from a person to combine with detection of the person's fingerprint pattern as a combination authentication method to identify whether the authorized person is accessing the device.

The disclosed technology uses probe light at two or more different probe light wavelengths in the additional sensing mechanism where the human skin provides different optical responses at the two or more different wavelengths. Measurements of such optical responses at the two or more different wavelengths are used to combine with the positive identification of the person's fingerprint pattern to authenticate the access. This additional layer of authentication can improve the level of authentication and the security that may not be possible by using the fingerprint pattern alone. In the specific examples described below, the two or more different probe light wavelengths may be selected so that reflectance or absorption of the person's skins due to presence of the blood in the skin and the oxygen level in the blood to cause different optical responses in the reflected light or transmitted light at the selected two or more different wavelengths. In implementation, the device can include two sensor devices: (1) a fingerprint pattern recognition sensor and (2) an optical detection module for producing probe light of two or more different wavelengths and for measuring the reflectance or transmission of the probe light of the finger to measure the optical responses of the finger at the two or more different wavelengths. The measurements from the two sensor devices are combined to authenticate a person for accessing the device. In implementations, those two sensor devices can be integrated into a fingerprint ID module located on a surface of a device to enable a user to input the user's fingerprint when accessing the device. The appearance of such a fingerprint ID module may be similar to other fingerprint ID modules where only fingerprint patterns are detected and processed but the additional optical detection module based the measurements of probe light of two or more different wavelengths provides a unique added security and accuracy in granting proper user access to the device.

FIG. 1 shows a schematic of a cross-sectional view of a fingerprint detection module 100 (finger is not included). As shown in FIG. 1, fingerprint detection module 100 includes a substrate carrier 102 and a fingerprint sensor detector chip 104 affixed on top of substrate carrier 102. Fingerprint sensor detector chip 104 can use capacitive sensing to collect fingerprint data and detect fingerprints. However, fingerprint sensor detector chip 104 can also be configured to collect fingerprint data and detect fingerprints by non-capacitive means. Fingerprint detection module 100 also includes a protective cover 106 which is placed over fingerprint sensor detector chip 104 to protect fingerprint sensor detector chip 104 and can also serve as a dielectric spacer. Protective cover 106 may be made out of high dielectric-constant material, such as ceramic, sapphire, zirconia, among others. Protective cover 106 may also have a hard coating, such as diamond like carbon. Note that in the embodiment of FIG. 1, the edges of protective cover 106 extends beyond the edges of fingerprint sensor detector chip 104 in all directions.

Fingerprint detection module 100 additional includes a metal ring 108 placed on substrate carrier 102 and around protective cover 106, which protects the edge of protective cover 106 and can also serve as a signal electrode. Note also that a finger 110 (not part of fingerprint detection module 100) can make contact with metal ring 108 when finger 110 is pressed on fingerprint detection module 100 for fingerprint detection.

Figure 2:
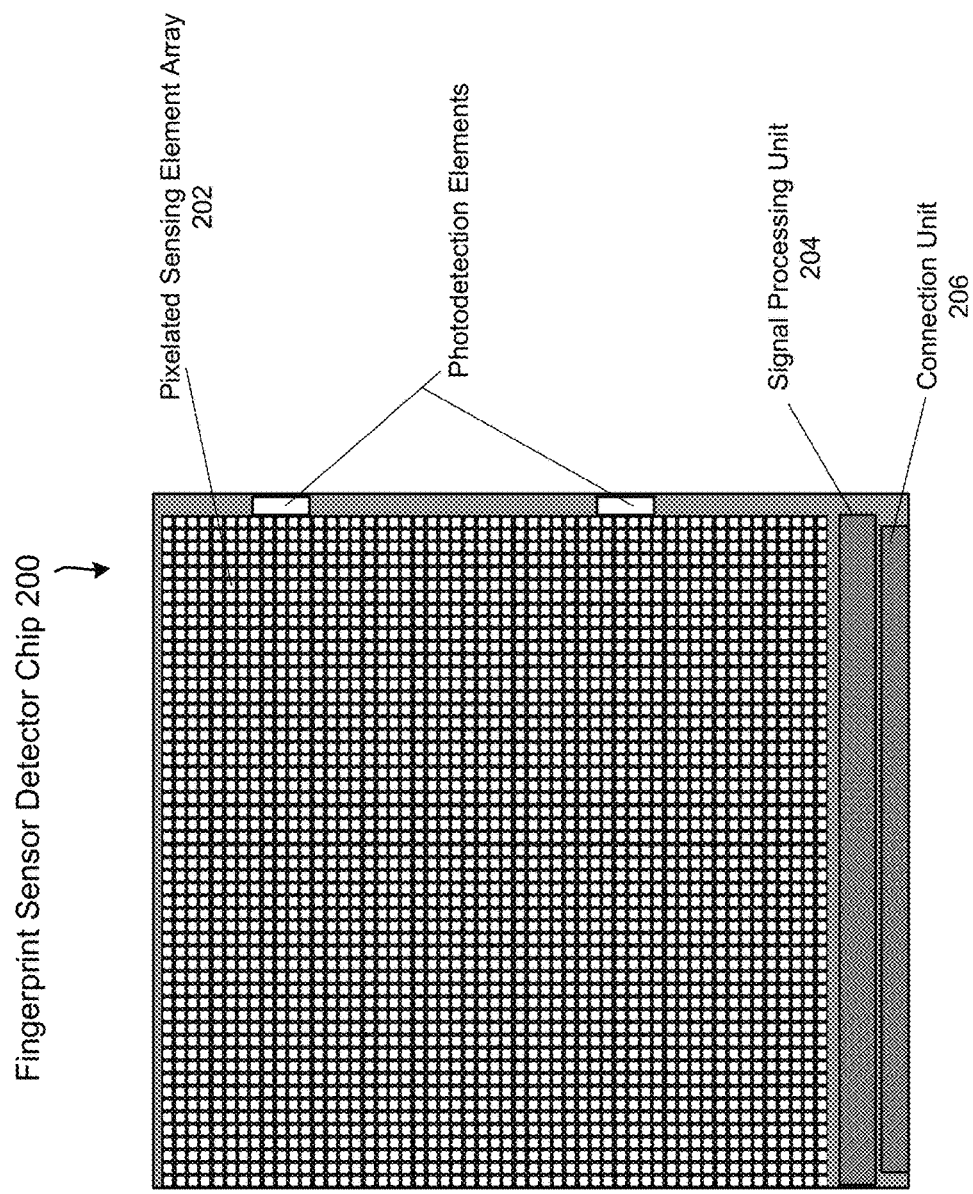
FIG. 2 shows a schematic of an exemplary fingerprint sensor detector chip.

FIG. 2 shows a schematic of an exemplary fingerprint sensor detector chip 200. Note that fingerprint sensor detector chip 200 (or "sensor chip 200") may be used as sensor chip 104 in fingerprint detection module 100 or in combination with other types of fingerprint detection modules described below.

As shown in FIG. 2, fingerprint sensor detector chip 200 comprises a pixelated sensing element array 202 which occupies a significant portion of the sensor chip. Each sensing element in pixelated sensing element array 202 may be a CMOS capacitive sensor or other types of sensors capable of sensing fingerprint features. Fingerprint sensor detector can also include a signal processing unit 204 for processing signals received from pixelated sensing element array 202, and a connection unit 206 coupled to signal processing unit 204. Connection unit 206 may include multiple electrodes which can be connected to external circuitry through wire-bonding, bump bonding or other connection means. Connection unit 206 may be situated along an edge of sensor chip 200 for the convenience of interfacing with other components of a fingerprint detection module.

Note that sensor chip 200 also includes one or more photodetection elements 208, which may be located at one or more sections of sensor chip 200. Photodetection elements 208 can include, but are not limited to CMOS photodetectors, charge-coupled devices (CCD) photodetectors, light-emitting diode (LED) photodetectors, photoresistors, photovoltaic photodetectors, and photodiodes. In the embodiment shown, there are two photodetection elements located along one edge section of the sensor chip. In one embodiments, there can be just a single photodetection element or more than two photodetection elements. The multiple photodetection elements may be located at different edge sections of the silicon chip instead of all on the same side of the chip. Note that while FIG. 2 shows that photodetection elements 208 are integrated with pixelated sensing element array 202 on the same chip, other embodiments can have the photodetection elements off the sensor chip on a different area of the fingerprint sensor module.

Figure 3A:
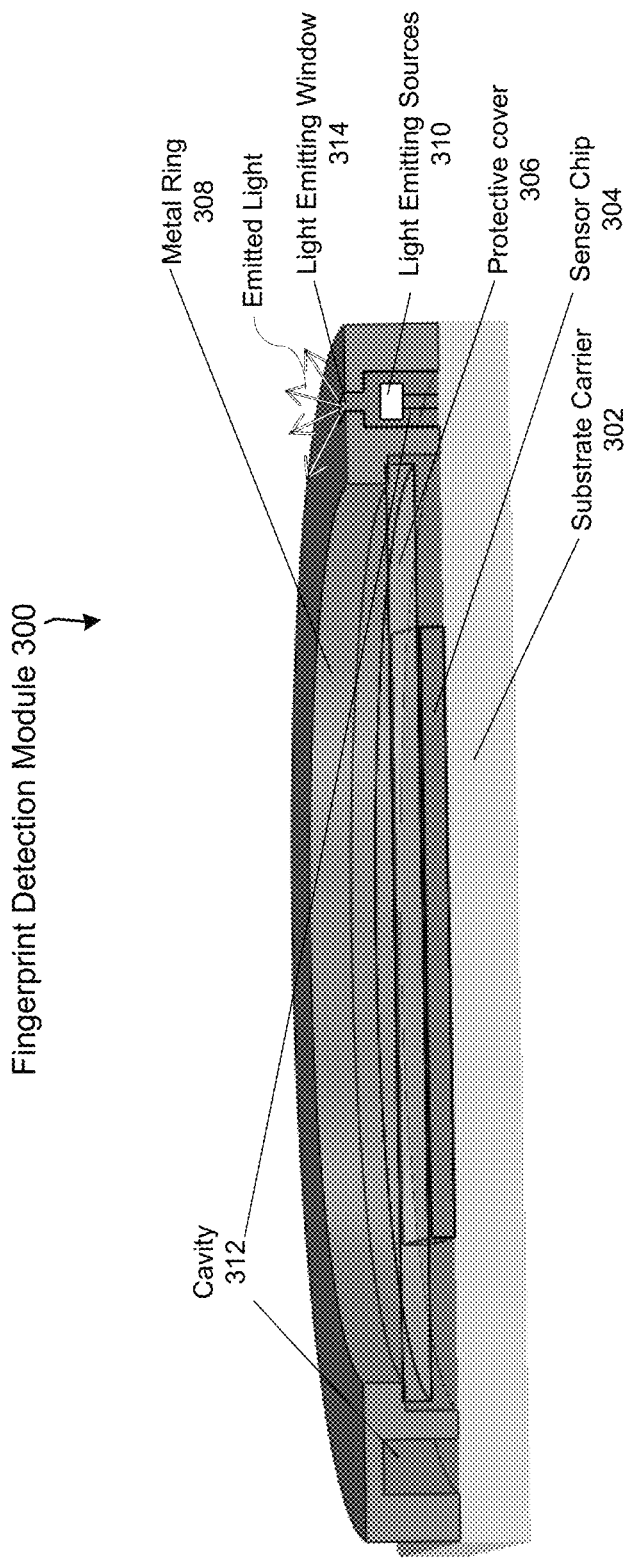
FIG. 3A shows a perspective and cross-sectional view of a fingerprint detection module which includes an optical sensing mechanism for determining whether a detected object is human.

FIG. 3A shows a perspective and cross-sectional view of a fingerprint detection module 300 which includes an optical sensing mechanism for determining whether a detected object is human. Similarly to fingerprint detection module 100, fingerprint detection module 300 includes a substrate carrier 302, a fingerprint sensor detector chip 304, a protective cover 306, and a metal ring 308. Fingerprint sensor detector chip 304 can be fingerprint sensor detector chip 200 to include one or more photodetection elements. In some embodiments however, the one or more photodetection elements are located off of sensor chip 200 and on another area of substrate carrier 302 cavity protective cover 306. The protective cover can be made of transparent materials, such as sapphire or zirconia. If there are cosmetic coloring applied to protective cover 306, a transparent window may be used on protective cover 306 to allow light to go through. Note that in this embodiment, protective cover 306 covers the entire surfaces of sensor chip 304.

Fingerprint detection module 300 also includes one or more light emitting sources 310 which can be placed within a cavity 312 of metal ring 308. Light emitting sources 310 can include one or more light emitting diode (LED) chips, one or more diode lasers, or one or more other miniature light emitting devices. An exemplary LED chip in such applications can have an area of ~200 μm×200 μm and a thickness of ~200 μm. In the embodiment shown, cavity 312 has a ring structure which is formed around the underside of metal ring 308. However, cavity 312 in metal ring 308 can have many other configurations, for example, to only present around the locations of light emitting sources 310.

Light emitting sources 310 can be configured to emit detection light of desirable wavelengths in response to a human finger or an object making contact with fingerprint detection module 300. For example, metal ring 308 can serve as a sensing electrode to detect the contact from a human finger or an object. Light emitting sources 310 can emit light through one or more light emitting windows which cut through metal ring 308 to connect to cavity 312. In FIG. 3A, a light emitting window 314 is located directly above one of the light emitting sources 310 inside cavity 312. In some embodiments, light emitting sources 310 include an modulated light source.

Figure 3B:
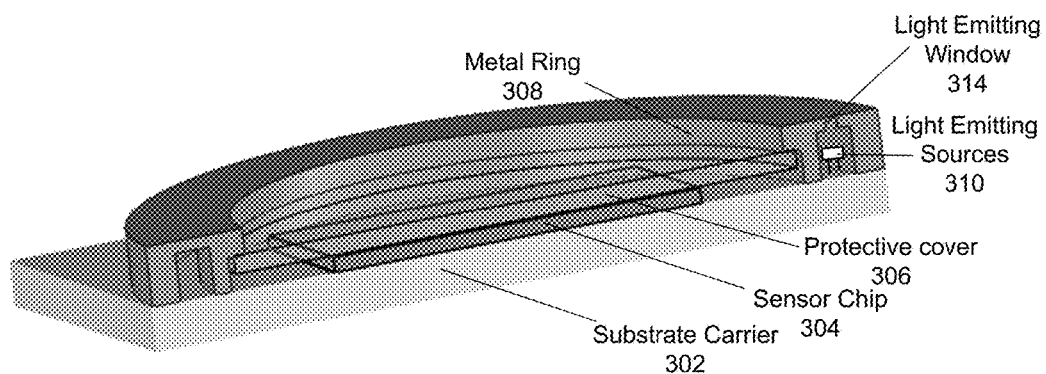
FIG. 3B provides another perspective and cross-sectional view of the fingerprint detection module in FIG. 3A.
Figure 3C:
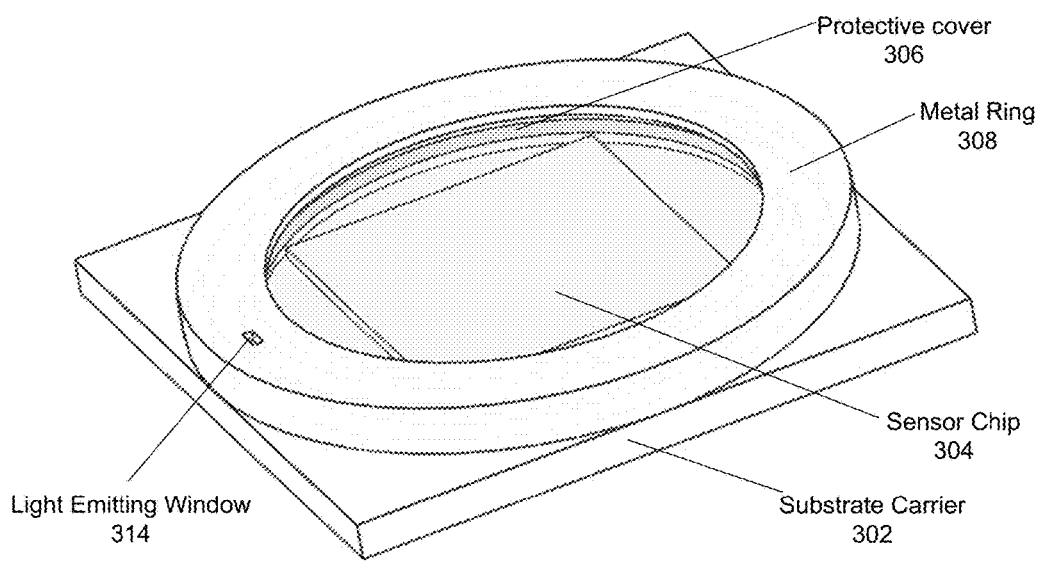
FIG. 3C provides a perspective view of the entire fingerprint detection module in FIG. 3A.

FIG. 3B provides another perspective and cross-sectional view of fingerprint detection module 300. FIG. 3C provides a perspective view of entire fingerprint detection module 300.

Figure 4:
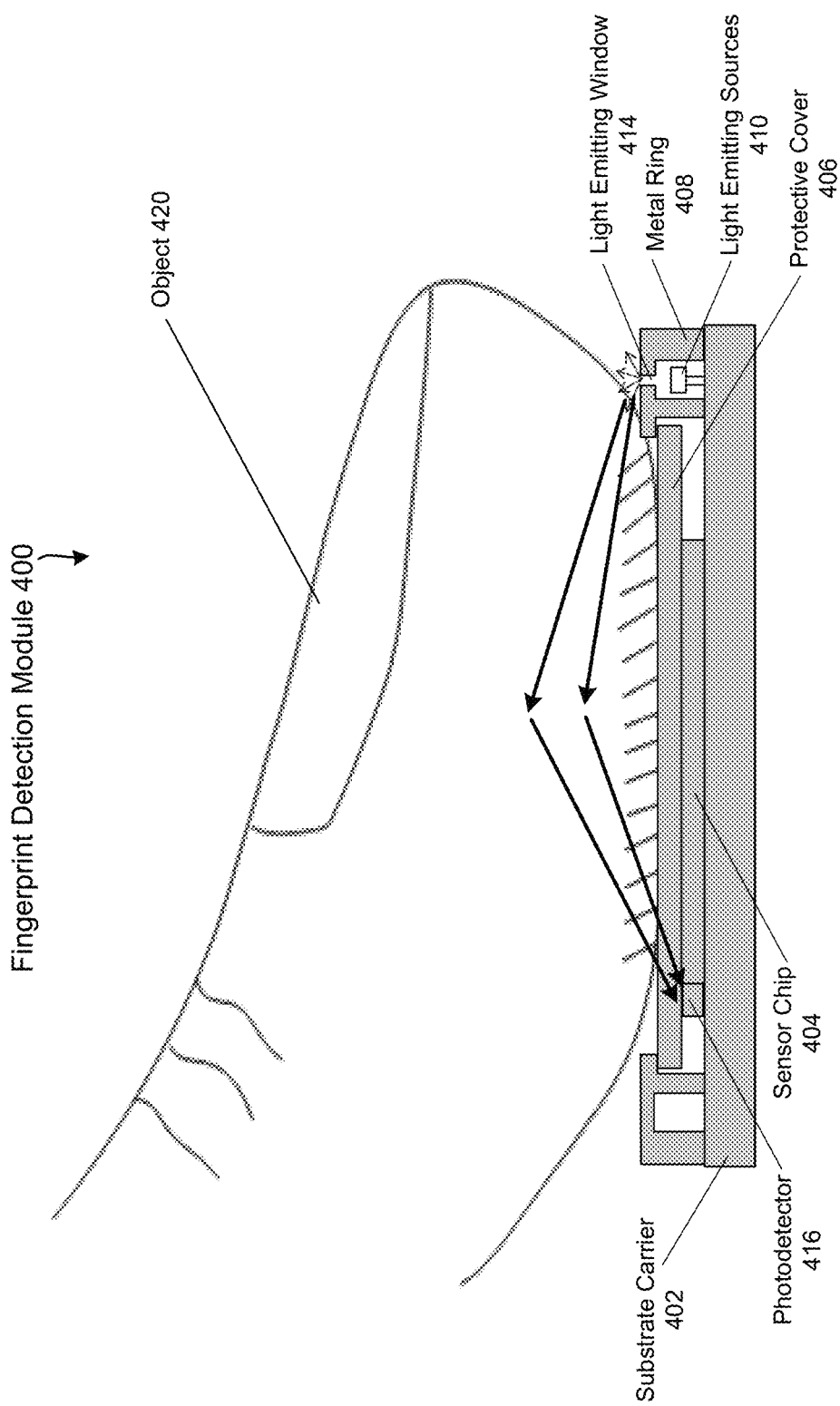
FIG. 4 illustrates the concept of using a fingerprint detection module to detect and determine if a detected object is human.

FIG. 4 illustrates the concept of using a fingerprint detection module 400 (which is substantially similar to fingerprint detection module 300) to detect and determine where a detected object is human. While FIG. 4 is described in the context of fingerprint detection module 400, the techniques described are general applicable to many variations of fingerprint detection module 400, some of which will be described later in the disclosure.

As mentioned above, fingerprint detection module 400 includes substrate carrier 402, protective layer 406, metal ring 408 and sensor chip 404, which may include a capacitive sense array for sensing a fingerprint's ridge and valley patterns. Fingerprint detection module 400 includes light emitting sources 410 which reside within a cavity under metal ring 408. In some implementations, light emitting sources 410 can emit at least two different wavelengths through light emitting window 414 of metal ring 408. Fingerprint detection module 400 also includes one or more photodetectors 416 which can either be integrated on sensor chip 404 or separately placed on substrate carrier 402. In the embodiment shown, photodetectors 416 are located on an edge of sensor chip 404.

In some implementations, when an object 420 (not part of fingerprint detection module 400) makes contact of fingerprint detection module 400, light emitting sources 410 emits detection light through light emitting window 414. The detection light is reflected off object 420 and the reflected light can be received and measured by photodetectors 416. In particular implementations, one or more wavelengths of detection light are emitted by light emitting sources 410. For heartbeat detection, one wavelength of detection light is sufficient. For detecting touch from actual human fingerprint, while one wavelength of detection light is enough, two or more wavelengths can be beneficial. For example, for one wavelength, the wavelength selected can be 660 nm. For two or more wavelengths, one wavelength selected can be 660 nm and the other wavelength can be one of 905 nm, 910 nm or 940 nm. In another embodiments, the two wavelengths selected can be 590 nm and 805 nm respectively. In yet another embodiments, the two wavelengths selected can be 520 nm and 575 nm. In some embodiments, only one wavelength is needed and any one of the above identified wavelengths or other wavelengths appropriate for the application (e.g., heartbeat detection) can be used.

Figure 5B:
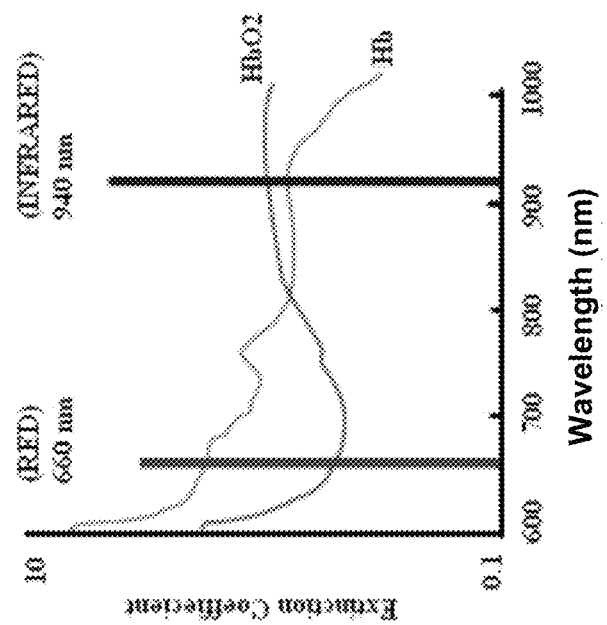
FIG. 5B shows a data plot of human blood light absorption property (in extinction coefficient) as a function of the wavelength of the light source.
Figure 5A:
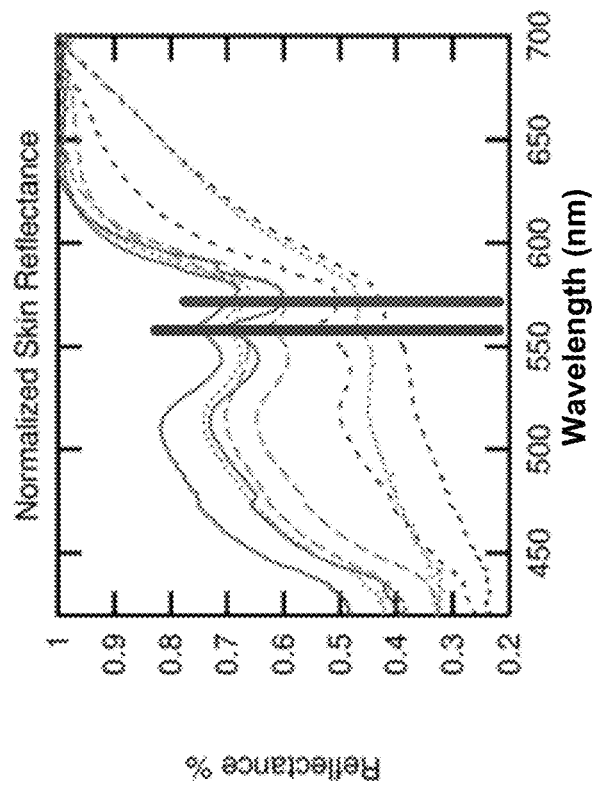
FIG. 5A shows a data plot of normalized human skin reflectance (in %) as a function of wavelength of the light source.

FIG. 5A shows a data plot of normalized human skin reflectance (in %) as a function of the wavelength of the light source. Note that human skin has different reflectance in response to different wavelengths and this relationship can be measured. As a result, the photodetector signals corresponding to the reflected light from the two selected wavelengths can be significantly different. In some implementations, photodetectors 416 can be configured to measure the reflected light from both wavelengths. The ratio of the two measurements can then be computed and compared to a standard or calibrated value for human finger/skin to determine if object 420 is human finger or not. The computation, comparison, and determination operations can be performed by an on-chip signal processing unit such as signal processing unit 204 shown in FIG. 2.

FIG. 5B shows a data plot of human blood light absorption property (in extinction coefficient) as a function of the wavelength of the light source. Note that human blood has different absorptions in response to different wavelengths. Moreover, for blood Hemoglobin lack of Oxygen (referred to as "Hb state") and bound with Oxygen (referred to as "HbO2 state"), the absorption behaviors are also significantly different. As a result, the photodetector signals corresponding to the reflected light from the two selected wavelengths can be significantly different, and the photodetector signals corresponding to the reflected light from the same wavelength under Hb or HbO2 state can also be significantly different. In some implementations, photodetectors 416 can be configured to measure the transmitted light through object 420 for both wavelengths. The ratio of the two measurements can then be computed and compared to a standard or calibrated value for human blood absorption to determine if object 420 is human finger or not. The computation, comparison, and determination operations can be performed by an on-chip signal processing unit such as signal processing unit 204 shown in FIG. 2.

Photodetectors 416 can also be configured to measure the transmitted light through object 420 for one or both wavelengths under both Hb state and HbO2 state. The ratio of the two measurements at two different wavelengths in each of the two states can then be computed and compared to standard or calibrated values for human blood absorption to determine if object 420 is human finger or not. The computation, comparison, and determination operations can be performed by an on-chip signal processing unit such as signal processing unit 204 shown in FIG. 2.

The above measurements in FIG. 5A or 5B or both at the two different optical wavelengths can also be used to measure the person's heartbeat based on the oxygen level in the blood due to pumping by the heart. The two different wavelengths can be at the red spectral range and the infrared spectral range, respectively. The heartbeat measurement is used in some pulse oximeter devices or heart rate monitors based on measurements of the saturated level of oxygen in the blood. The relative absorption of red (absorbed by oxygenated blood) and infrared (absorbed by deoxygenated blood) light correlates to arterial blood oxygen saturations. Measurements of relative light absorption are made and are processed to generate the heart beat rate. This heart beat measurement provides another check on whether the person is present when the fingerprint pattern is presented to the target device that is to be accessed.

As mentioned above, a touch sensor within the fingerprint detection module, such as metal ring 408 in fingerprint detection module 400 can be used to detect the initial contact of an object, such as a user's finger. In one embodiment, the metal ring may be part of circuitry for initial contact detection and module activation. In some embodiments, the fingerprint detection module can be in a standby mode (i.e., power saving mode) before the detection of a new contact. Upon detecting a new contact, the metal ring circuitry then activates the main circuit of the fingerprint detection module. When a current fingerprint detection and authentication process is complete, the main circuitry of the fingerprint detection module can be turned off or deactivated and the fingerprint detection module returns to the standby mode while the metal ring circuitry remains active and ready for next contact.

Figure 6A:
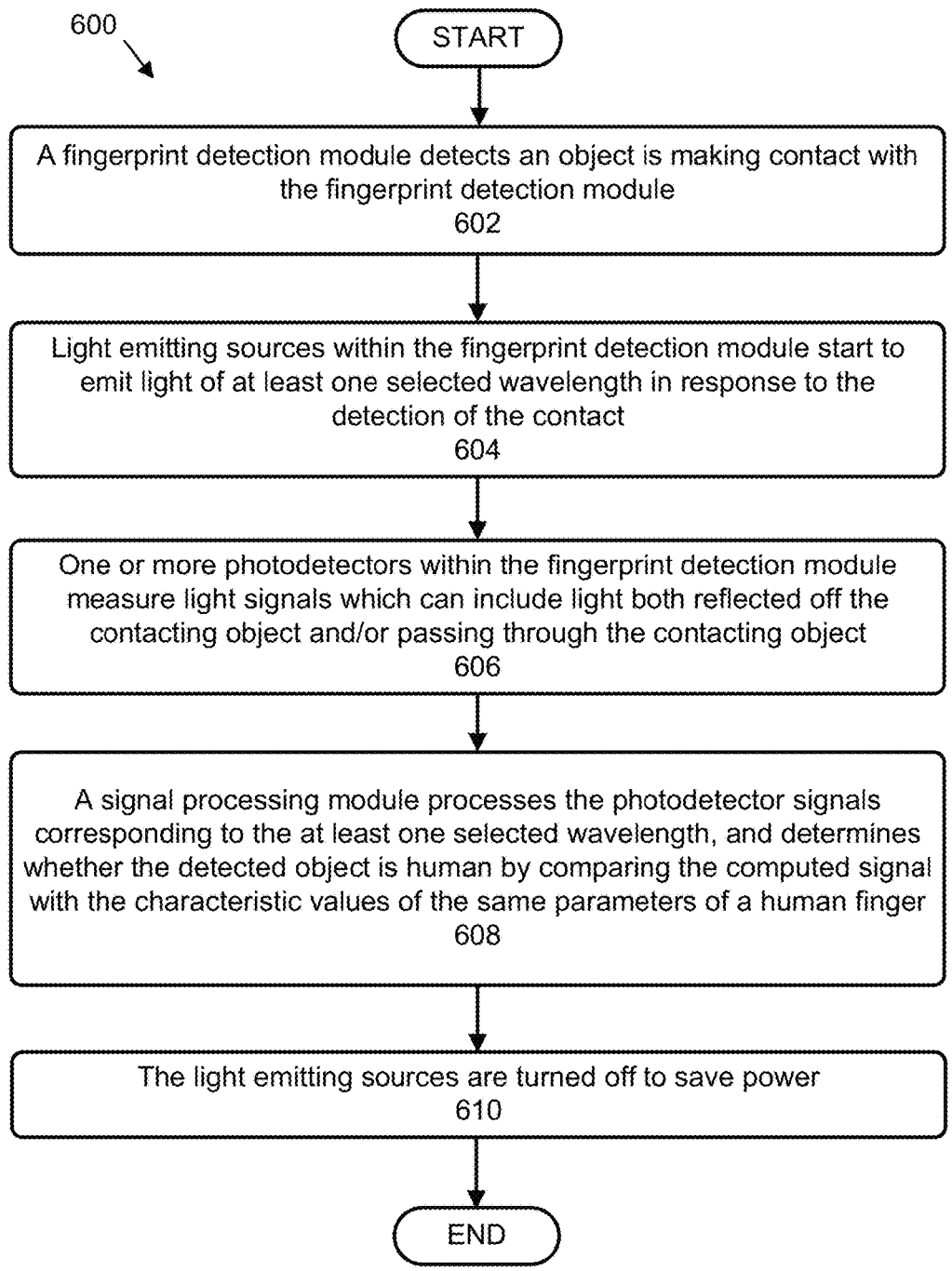
FIG. 6A presents a flowchart illustrating a process of using a fingerprint detection module to detect and determine if a detected object is human.

FIG. 6A presents a flowchart illustrating a process 600 of using a fingerprint detection module to detect and determine if a detected object is human. The process 600 may be understood in the context of fingerprint detection module 400. The process may begin when the fingerprint detection module detects an object is making contact with the fingerprint detection module (602). In one embodiment, the metal ring within the fingerprint detection module and associated circuit (e.g., metal ring 408 in module 400) may be used for the contact detection. Note that light emitting sources within the fingerprint detection module may be in off mode at this point and may be activated by the detection of the contact. Light emitting sources within the fingerprint detection module start to emit detection light of two selected wavelengths in response to the detection of contacting object (604). The one or more photodetectors within the fingerprint detection module measure light signals which can include a portion of the detection light reflected off of the contacting object and/or a portion of the detection light passing through (i.e., transmitted light) the contacting object (606). Note that the portion of the detection light passing through the contacting object can be used to determine a light absorption property of the contacting object. A signal processing module processes the photodetector signals corresponding to the two selected wavelengths, and determines whether the detected object is human by comparing the computed signal ratios of the two selected wavelengths with the characteristic values of the same parameters of a human finger (608). When the detection and authentication process is complete, the light emitting sources may be turned off to save power (610).

As mentioned above, a metal ring within the fingerprint detection module, such as metal ring 408 in fingerprint detection module 400 can be used to detect the initial contact of a finger or an object. In one embodiment, the metal ring may be part of a circuit for initial contact detection and module activation. In some embodiments, the fingerprint detection module can be in a standby mode (i.e., power saving mode) before the detection of a new contact. Upon detecting a new contact, the metal ring circuit then activates the main circuit of the fingerprint detection module. When a current fingerprint detection and authentication process is complete, the main circuit of the fingerprint detection module can be turned off or deactivated and the fingerprint detection module returns to the standby mode while the metal ring circuit remains active and ready for next contact.

Figure 6B:
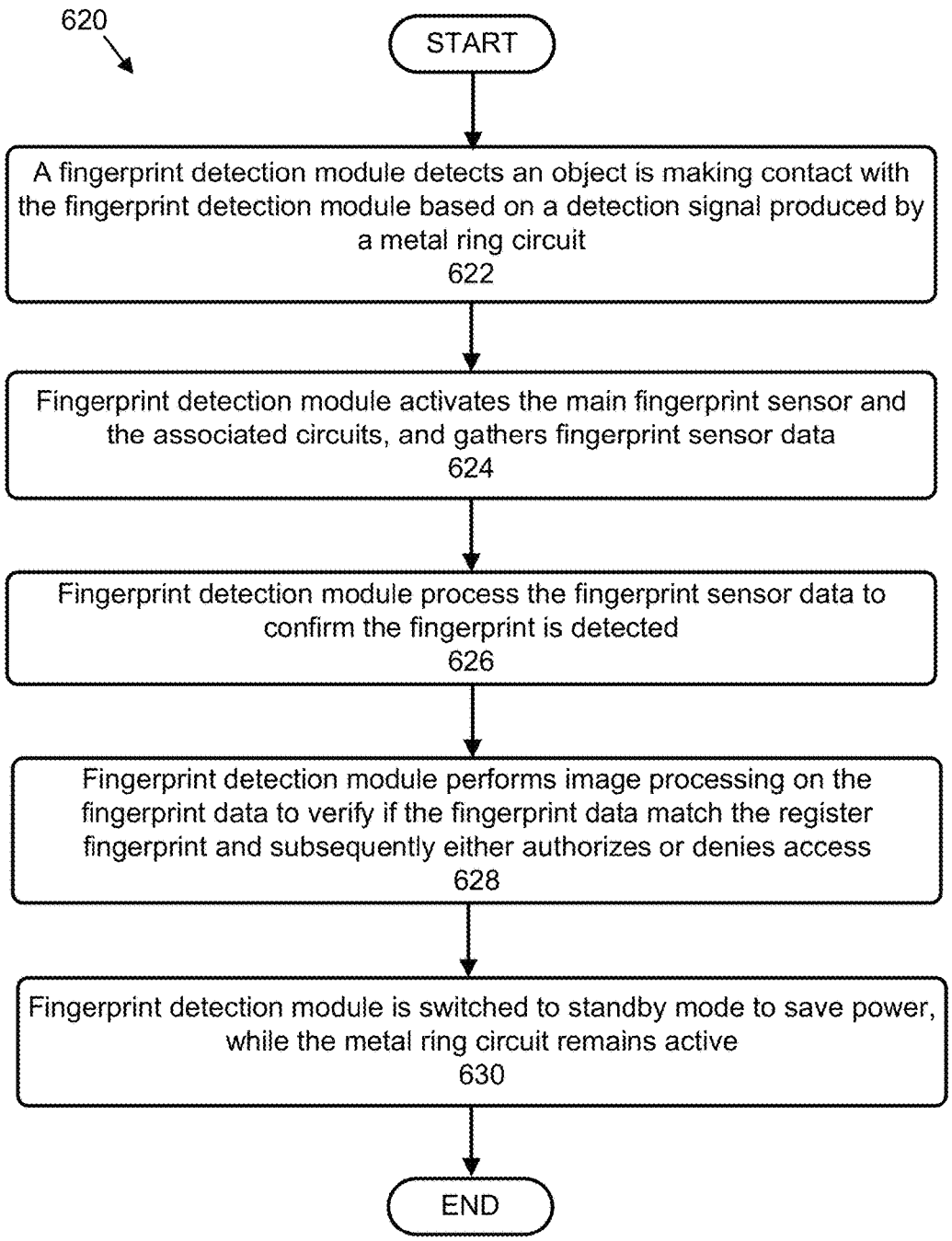
FIG. 6B presents a flowchart illustrating a process of using a fingerprint detection module having a metal ring circuit for fingerprint detection and authentication.

FIG. 6B presents a flowchart illustrating a process 620 of using a fingerprint detection module (e.g., fingerprint detection module 400) having a metal ring circuit for fingerprint detection and authentication in accordance with some embodiments described in this patent document. Before the process begins, the main fingerprint sensor and the associated circuits (which can include the fingerprint sensor chip, and/or the light emitting sources and the photodetectors) of the fingerprint detection module are in standby mode (i.e., power saving mode), and only a metal ring circuit is functional or active. Note that the metal ring circuit includes both the metal ring as a sensor and an associated circuit coupled to the metal ring to generate a detection signal when an object makes contact with the metal ring. The process begins when the fingerprint detection module detects that an object is making contact with the fingerprint detection module based on a detection signal produced by the metal ring circuit (622). Next, the fingerprint detection module activates the main fingerprint sensor and associated circuits, and gathers fingerprint sensor data (e.g., by scanning the object) (614). Fingerprint detection module then processes the collected fingerprint sensor data to confirm the fingerprint is detected (616). When the fingerprint detection module cannot confirm the fingerprint data at the process at 616, fingerprint detection module may continue to gather fingerprint sensor data. The fingerprint detection module performs image processing on the gathered fingerprint data to verify whether the fingerprint data match the register fingerprint and either authorizes or denies access (618). After authentication process is complete, the fingerprint detection module is switched to standby mode to save power, while the metal ring circuit remains active (620).

Figure 7:
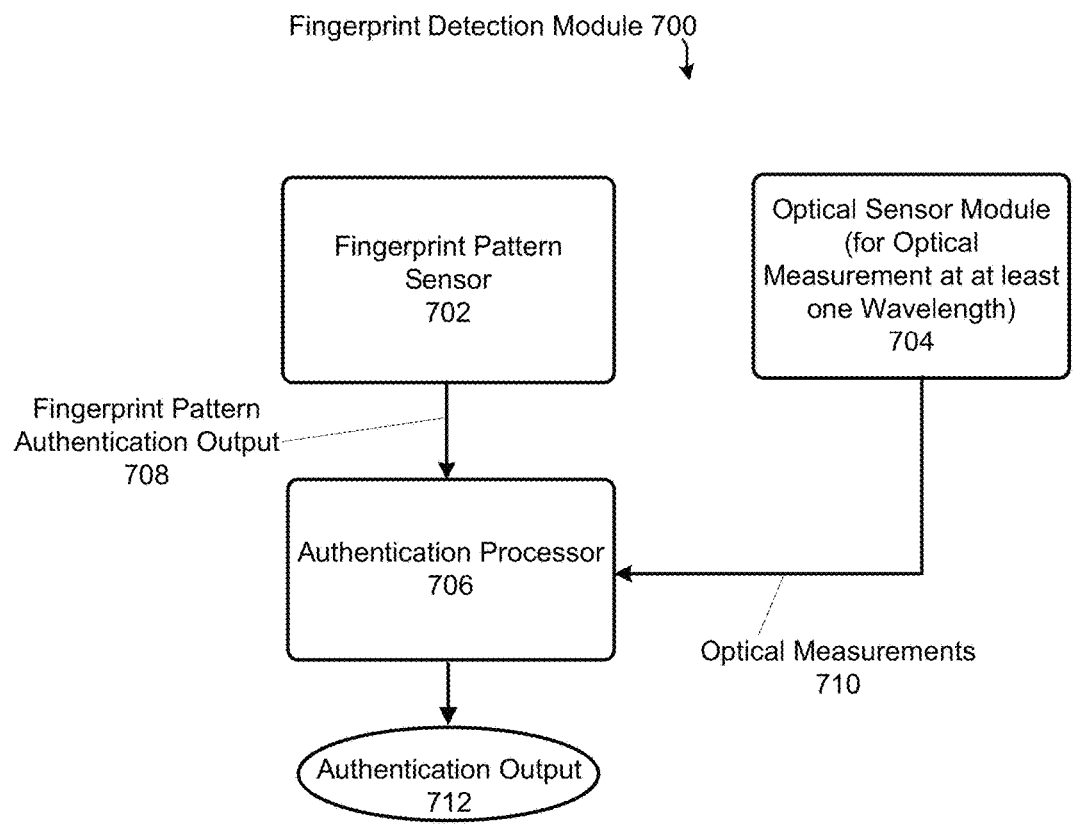
FIG. 7 presents a diagram of a fingerprint detection module for performing human fingerprint detection and authentication.

FIG. 7 presents a data flow diagram of an exemplary fingerprint detection module 700 for performing human fingerprint detection and authentication in accordance with some embodiments described in this patent document. As shown in FIG. 7, fingerprint detection module 700 includes a fingerprint pattern sensor 702 and an optical sensor module 704, both of which are coupled to an authentication processor 706. Fingerprint pattern sensor 702 includes a sensor array which reads a fingerprint pattern and a fingerprint pattern processor in communication with the sensor array to determine whether the fingerprint pattern read by the sensor array matches stored information of an authorized person's fingerprint pattern to provide a fingerprint pattern authentication output 708. Optical sensor module 704 produces probe light at one or more optical wavelengths to which a person's skin produces different optical responses at the one or more optical wavelengths due to presence of blood in the person's skin. Optical sensor module 704 also includes an optical detection unit that receives a reflection or transmission of the probe light to produce data indicative of optical measurements 710 of the probe light at the one or more optical wavelengths. The produced data indicative of optical measurements 710 are provided to the authentication processor 706. The authentication processor 706 receives the fingerprint pattern authentication output 708 from fingerprint pattern sensor 702 and the optical measurements 710 data of the probe light at the one or more optical wavelengths from optical sensor module 704 and to combine both fingerprint pattern authentication output 708 and optical measurements 710 of the probe light to produce an authentication output 712 which can be used to determine whether an access is to be granted or denied.

Figure 8A:
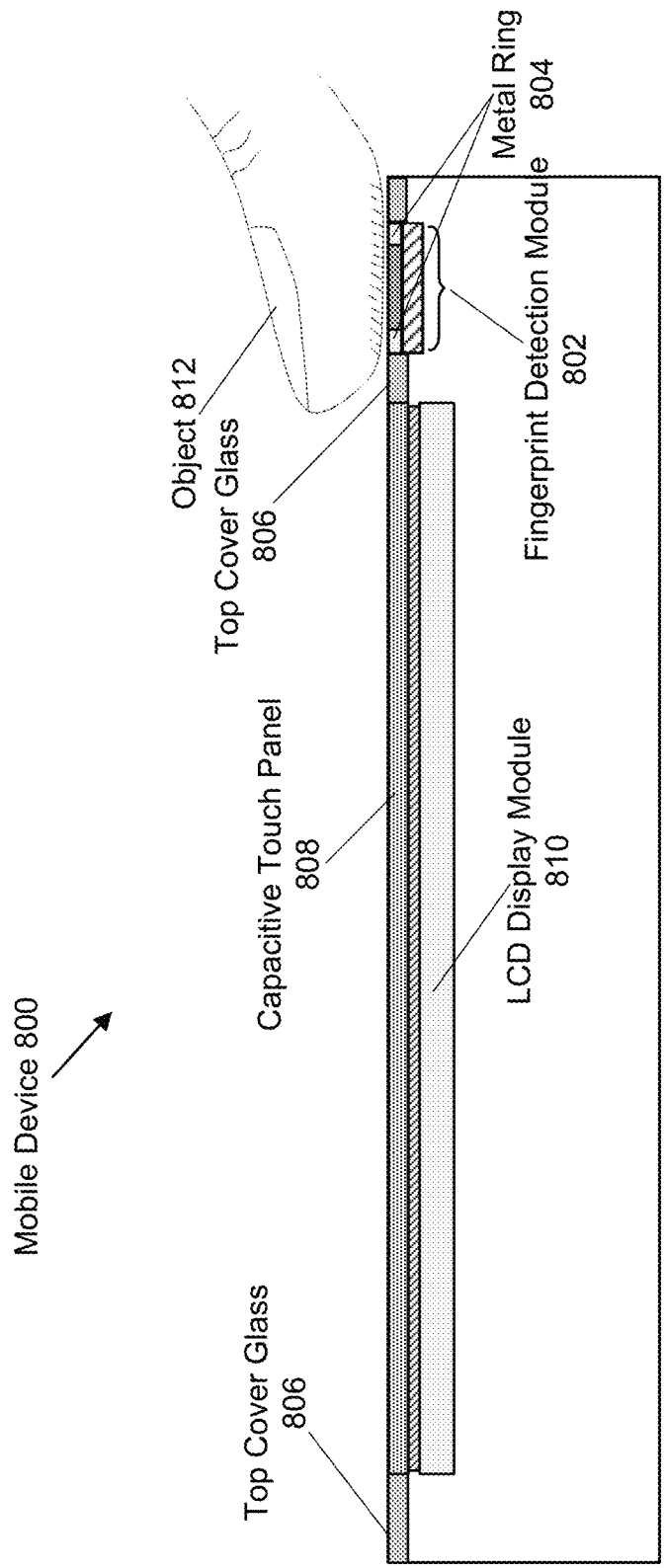
FIG. 8A shows a schematic of a mobile device integrated with a touch panel and a fingerprint detection module.

FIG. 8A is a schematic showing a cross sectional view of an exemplary mobile device 800 integrated with a touch screen assembly and a fingerprint detection module. As shown in FIG. 8A, mobile device 800 (e.g., a smartphone) includes a fingerprint detection module 802 having a touch sensor such as a metal ring 804 positioned to be substantially level with a surface of mobile device 800 parallel with a surface of top cover glass 806 exposed to the user. The touch sensor can be implemented using any conductive material, such as any number of known metals. In addition, the shape of the touch sensor can vary based on the shape and design of the fingerprint detection module. The touch sensor can be designed to border at or near the outline of the fingerprint detection module so as to substantially surround the portion of the fingerprint detection module exposed to a user. For example, for a fingerprint detection module in a round shape, a metal ring can be used as the touch sensor. For a fingerprint detection module shaped as a rectangle, the touch sensor can be formed in the shape of a rectangular frame. The top cover glass 806 of mobile device 800 includes an opening to allow fingerprint detection module 802 to fit through and be exposed on the surface. In addition, top glass 806 can be implemented using transparent materials other than glass including various crystalline structures, such as sapphire that provides the mobile device 800 with protection while allowing at least visible light to pass through. Mobile device 800 also includes a touch panel 808 and an LCD display module 810 positioned underneath capacitive touch panel 808. Touch panel 808 can be implemented using various touch technologies including a capacitive touch sensor, an inductive touch sensor, and other touch sensors. The touch panel and the LCD display module 810 together form the touch screen assembly. When mobile device 800 is locked, LCD display module 810 is turned off and a main processor of mobile device 800 and fingerprint detection module 802 are in standby mode. To unlock mobile device 800, a user can make contact with the fingerprint detection module 802 with the user's finger, for example. A touch sensor such as metal ring 804 and associated circuitry communicatively coupled to the metal ring 804 can be used to detect a contact from an object 812 with the fingerprint detection module 802. The touch sensor and associated circuitry can be used to activate fingerprint detection module 802 responsive to a light contact, without additional user input through a mechanical switch, such as actuating a physical button.

Figure 8B:
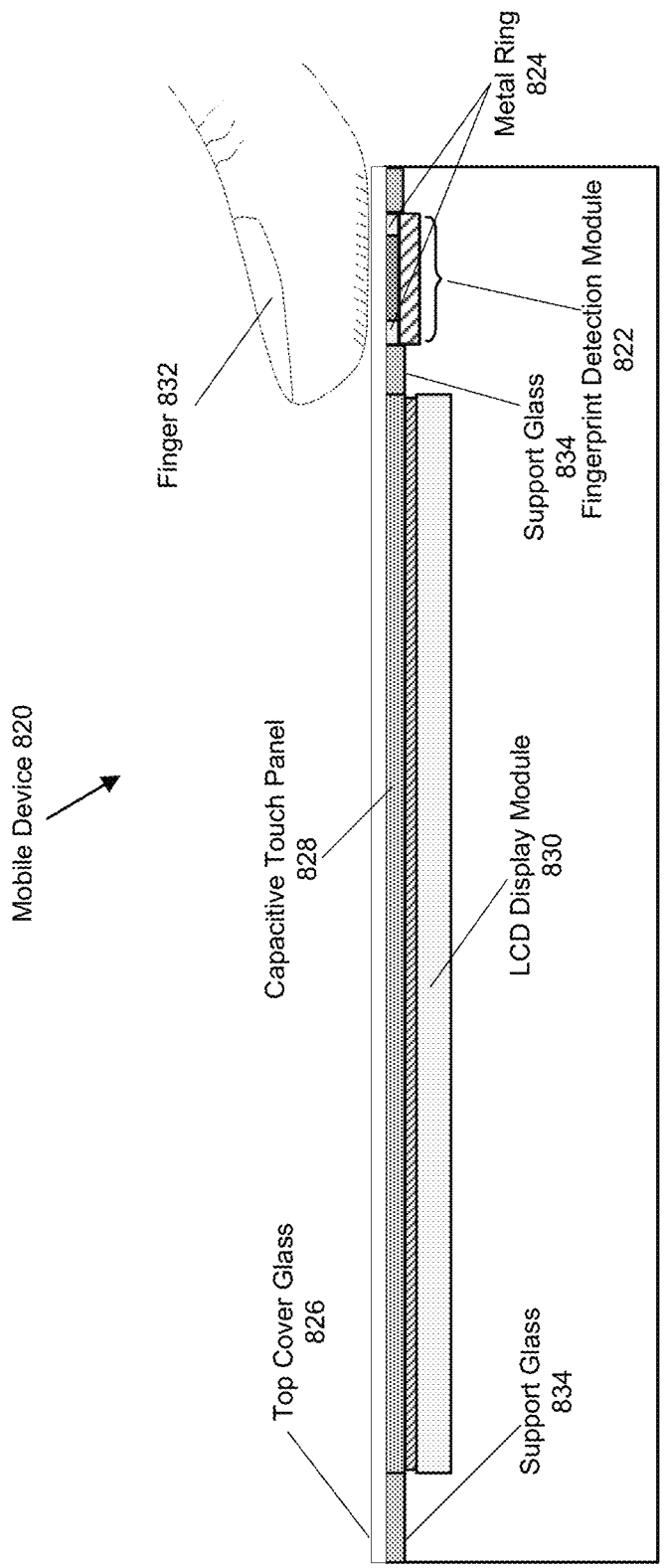
FIG. 8B shows a schematic of another mobile device integrated with a touch panel and a fingerprint detection module.

FIG. 8B is a schematic showing a cross sectional view of another exemplary mobile device 820 integrated with a touch screen assembly and a fingerprint detection module. Similar to mobile device 800 in FIG. 8A, mobile device 820 includes a fingerprint detection module 822 having a touch sensor, such as a metal ring 824. However, different from mobile device 800, the top cover glass 826 of mobile device 820 does not have an opening to expose the top surface (e.g., the surface exposed to the user) of fingerprint detection module 822. Instead, fingerprint detection module 822 is positioned underneath top cover glass 826 and is designed to sense a fingerprint of a finger without being directly in contact with the finger 832.

In the embodiment of FIG. 8B, top cover glass 826 protects touch panel 828 and LCD display module 830 of the touch screen assembly and other areas of a top surface of mobile device 820 substantially parallel with the top cover glass 826 beyond the touch sensitive area associated with the touch panel, including a location above fingerprint detection module 822. Touch panel 828 is embedded within a support glass 834 underneath top cover glass 826. Top cover glass 826 and support glass 834 can be implemented using materials similar to top cover glass 806. Support glass 834 includes an opening to allow fingerprint detection module 822 to pass through and be placed under the top cover glass 826. The location of the opening in support glass 834 may be closer to one end of support glass 834, similar to the relative location of the opening in top cover glass 806 in FIG. 8A. The fingerprint detection module 822 in this design can sense a contact from a fingerprint of a finger 832 with a top surface (e.g., the surface exposed to the user) of the hardened top cover glass 826 without having an object such as the finger 832 being in direct contact with a surface on the fingerprint detection module 822. This allows top cover glass 826 to fully cover both the touch screen assembly and the fingerprint sensor under a spatially contiguous protective surface without an opening.

In one embodiment, top cover glass 826 and support glass 834 are bonded together to form an overall cover glass structure that is significantly thicker and mechanically stronger than each of top cover glass 826 and support glass 834 individually. The two glass layers may be bonded with a thin adhesive layer, such as an epoxy adhesive layer. The overall thickness of the combined structure may be comparable to top cover glass 806 in FIG. 8A. Fingerprint detection module 822 which is positioned within the opening of support glass 834 may be directly attached underneath top cover glass 826.

In everyday uses when a user is holding or carrying mobile device 800 or mobile device 820 (e.g., in a pocket close to the body), unintended and incidental contacts on metal ring 804 or an surface area directly above metal ring 824 are common and can be difficult to avoid. Activation of fingerprint detection module 802 or 822 and/or the main processor of mobile device 800 or 820 from a standby mode due to unintended contacts with the touch sensor can negatively impact power consumption of a mobile device. Devices, systems, and techniques described in various embodiments of this document can potentially enable light contact activation of fingerprint detection module 802 or 822 while preventing unintended contacts from activating the same fingerprint detection module 802 or 822 and/or mobile device 800 or 820 from a standby mode.

Figure 9A:
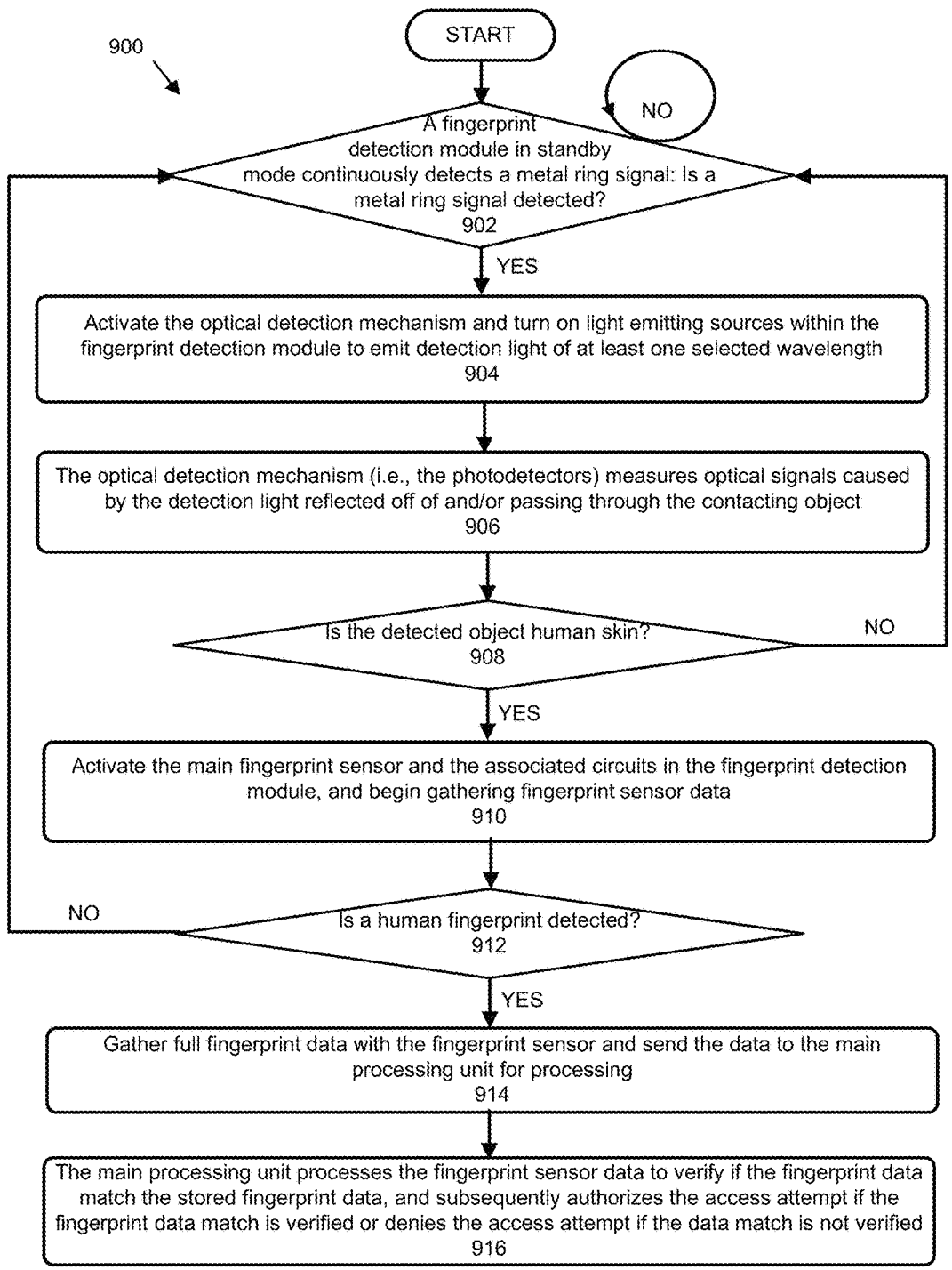
FIG. 9A presents a flowchart illustrating a process of activating a fingerprint detection module in standby mode and using the fingerprint detection module to authenticate an access attempt to a locked mobile device.

FIG. 9A presents a flowchart illustrating an exemplary process 900 of activating a fingerprint detection module from standby mode and using the fingerprint detection module to authenticate a user's request to gain access to a locked mobile device. The exemplary process 900 of FIG. 9A is described with respect to fingerprint detection module 400 and mobile device 800 or 820. A fingerprint detection module (e.g., fingerprint detection module 400) in standby mode has a touch sensor enabled to continuously receive from the touch sensor a touch sensor signal (e.g., a metal ring signal from the metal ring touch sensor) indicating a contact from an object with the touch sensor (e.g., metal ring) and the fingerprint detection module (902). In one embodiment, the metal ring touch sensor (e.g., metal ring 408 in module 400) of the fingerprint detection module and associated touch sensing circuitry (which may be integrated with sensor chip 404) are used for the contact detection. For example, the associated touch sensing circuitry can generate a signal in response to an increase of capacitive load on the metal ring caused by an object, such as a finger, making contact with the metal ring. Note that light emitting sources within the fingerprint detection module are not enabled at this point. Until a metal ring signal is detected at 902, the fingerprint detection module stays in standby mode waiting for the metal ring signal indicating a detected contact as shown in FIG. 9A.

Responsive to the fingerprint detection module receiving a metal ring signal from the touch sensor and associated touch sensing circuitry, the fingerprint detection module activates an optical detection module and turns on light emitting sources, such as LEDs within the fingerprint detection module to emit detection light of two selected wavelengths (904). The optical detection module includes one or more photodetectors within the fingerprint detection module (e.g., photodetector 416 in module 400) to measure optical signals associated with the emitted detection light reflecting off of the contacting object and/or the emitted detection light passing through (i.e., transmitted light) the contacting object (906). The detection light passing through the contacting object can be used to determine a light absorption property of the contacting object. A signal processing module processes photodetector signals corresponding to the measured optical signals in two predetermined wavelengths. Based at least partially on the processed photodetector signals, the signal processing module determines whether the detected contact is from human skin by comparing computed signal ratios of the processed photodetector signals at two selected wavelengths with the characteristic values of the same parameters of human skin (908). In some implementations, the optical detection module is integrated with the fingerprint sensor chip.

When the determination at 908 is that the detected contact is not from human skin, the fingerprint detection module is switched back to the standby mode (902). For example, the detected contact could be based on a non-human-skin object making contact with the metal ring, such as human body touching the metal ring through clothing. In one implementation, returning to the standby mode also involves turning off the light emitting sources. However, when the determination at 908 is that the detected contact is from human skin, the fingerprint detection module activates the main fingerprint sensor and the associated circuitry in the fingerprint detection module, and begins obtaining fingerprint sensor data from the human skin (910).

The fingerprint detection module processes the obtained fingerprint sensor data to determine whether a human fingerprint is detected (912). This is performed prior to full fingerprint verification to distinguish a human fingerprint from another part of human skin, such as another part of a human hand, human arm, and human face, making contact with the fingerprint detection module. In some implementations, the initial determination of human fingerprint at 912 does not obtain and process the full fingerprint data in order to save power and processing time. For example, the fingerprint sensor measures one-directional (1D) human skin profile and associated detection circuitry determines whether the measured 1D skin profile substantially matches a human fingerprint. The detection circuitry associated with the fingerprint sensor can compare the measured 1D skin profile with a typically 1D fingerprint contour that includes a periodic ridge and valley pattern and determine whether the measured 1D skin profile resembles a human fingerprint. Moreover, the detection circuitry used to perform the initial determination of human fingerprint at 912 can be low power detection circuitry within the fingerprint detection module, for example, circuitry integrated with the sensor chip. As such, performing the initial determination of human fingerprint at 912 does not require the main processor (e.g., the application processor) of the mobile device, which can remain in standby mode until full fingerprint verification is needed. Using partial fingerprint data and low power circuitry can ensure low power consumption at 910 and 912.

When the determination at 912 is that a human fingerprint is not detected from the human skin, the fingerprint detection module again is switched back to the standby mode at 902. For example, the detected contact from human skin without a human fingerprint can be the result of a contact from a side of the user's hand, arm or face with the metal ring. In one implementation, returning to the standby mode of 902 also includes turning off the light emitting sources.

When the determination at 912 is that the detected contact is from a human fingerprint, the fingerprint detection module then obtains full fingerprint data with the fingerprint sensor and sends the obtained full fingerprint data to the main processing unit for processing (914), which may involve waking up the main processing unit from the standby mode. The full fingerprint sensor data is processed by the main processing unit to verify whether the obtained full fingerprint data match the stored fingerprint data of an authorized user of the mobile device. Based on the outcome of the verification, the main processing unit authorizes or denies user access to the locked mobile device (916). The fingerprint detection module is switched back to the standby mode at 902 if access is denied. Otherwise, if the access is granted, the fingerprint detection module is also switched back to the standby mode but does not return back to 902.

Figure 9B:
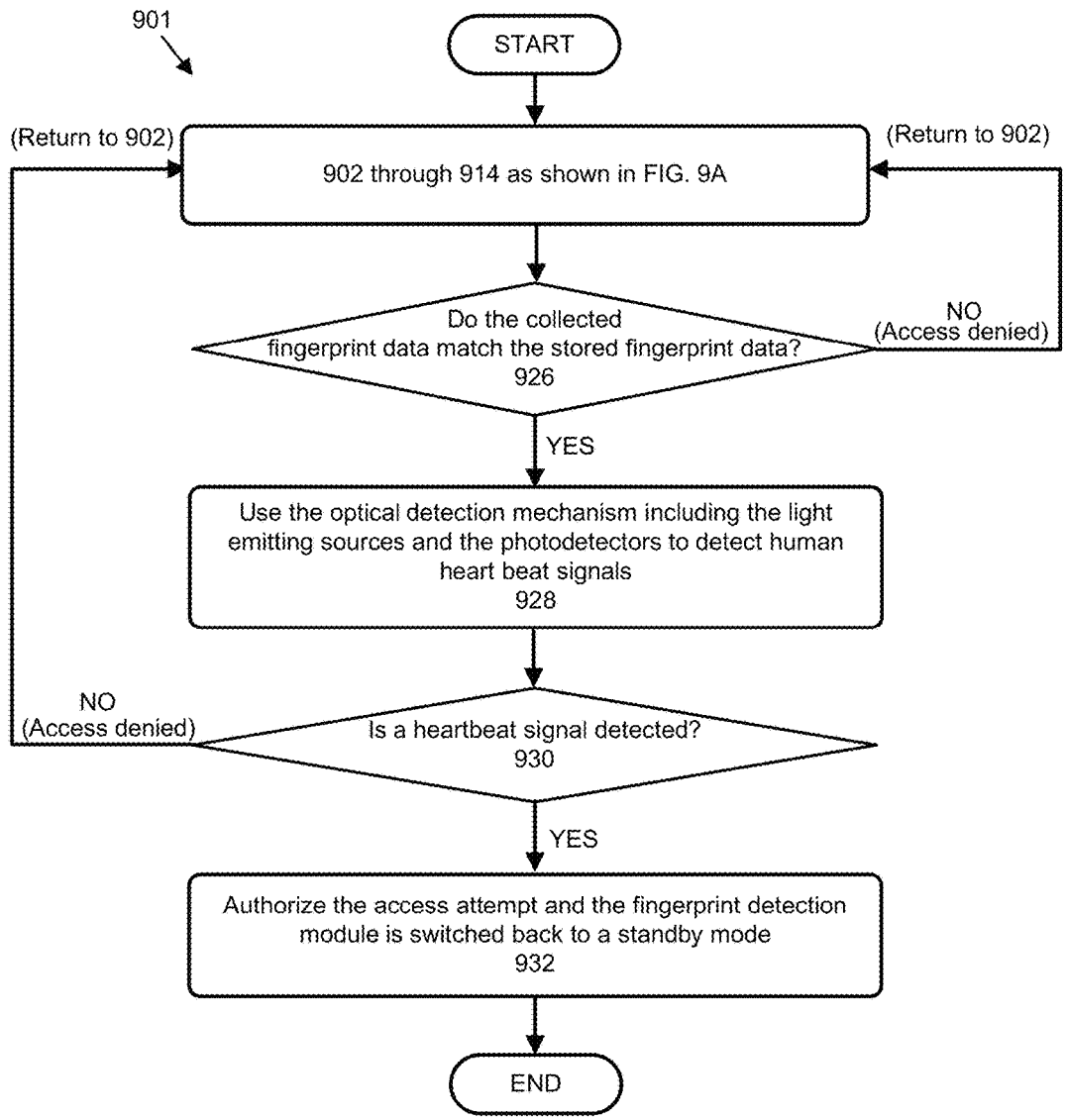
FIG. 9B presents a flowchart illustrating a process of activating a fingerprint detection module in standby mode and using the fingerprint detection module to authenticate an access attempt to a locked mobile device in a highly secure mode.

FIG. 9B presents a flowchart illustrating an exemplary process 901 of authenticating user request to access a locked mobile device in a high security mode based on a combination of fingerprint detection and optical heartbeat detection. The process 901 illustrated in FIG. 9B includes a fingerprint detection process which is substantially similar to the process 900 of FIG. 9A from (902) to (914). The full fingerprint sensor data obtained (914) is processed to verify whether the obtained fingerprint data match the stored fingerprint data of an authorized user of the locked mobile device (926). When no match is found, the user request to access the mobile device is denied and the fingerprint detection module is switched back to the standby mode (902). When a match is verified, the fingerprint detection module activates an optical detection module including the light emitting sources and the photodetectors to detect the presence of human heartbeat signals (928). Detecting the presence of human heartbeat signal can be performed with or without determining the actual heart beat rate. As described above, the two optical wavelengths emitted by the light emitting sources can be used to measure a user's heartbeat based on the oxygen level in the blood due to pumping of the heart. This heartbeat measurement offers an additional check on whether a live person is associated with the detected human fingerprint.

When the presence of a heartbeat signal is detected (930), the user request to access the locked mobile device is granted and the fingerprint detection module is switched back to a standby mode (932). Otherwise, the user request to access the locked mobile device is denied and the fingerprint detection module is switched back to the standby mode (902). Combining heartbeat detection with the fingerprint detection provides an added layer of security to the user authentication procedure.

Figure 10:
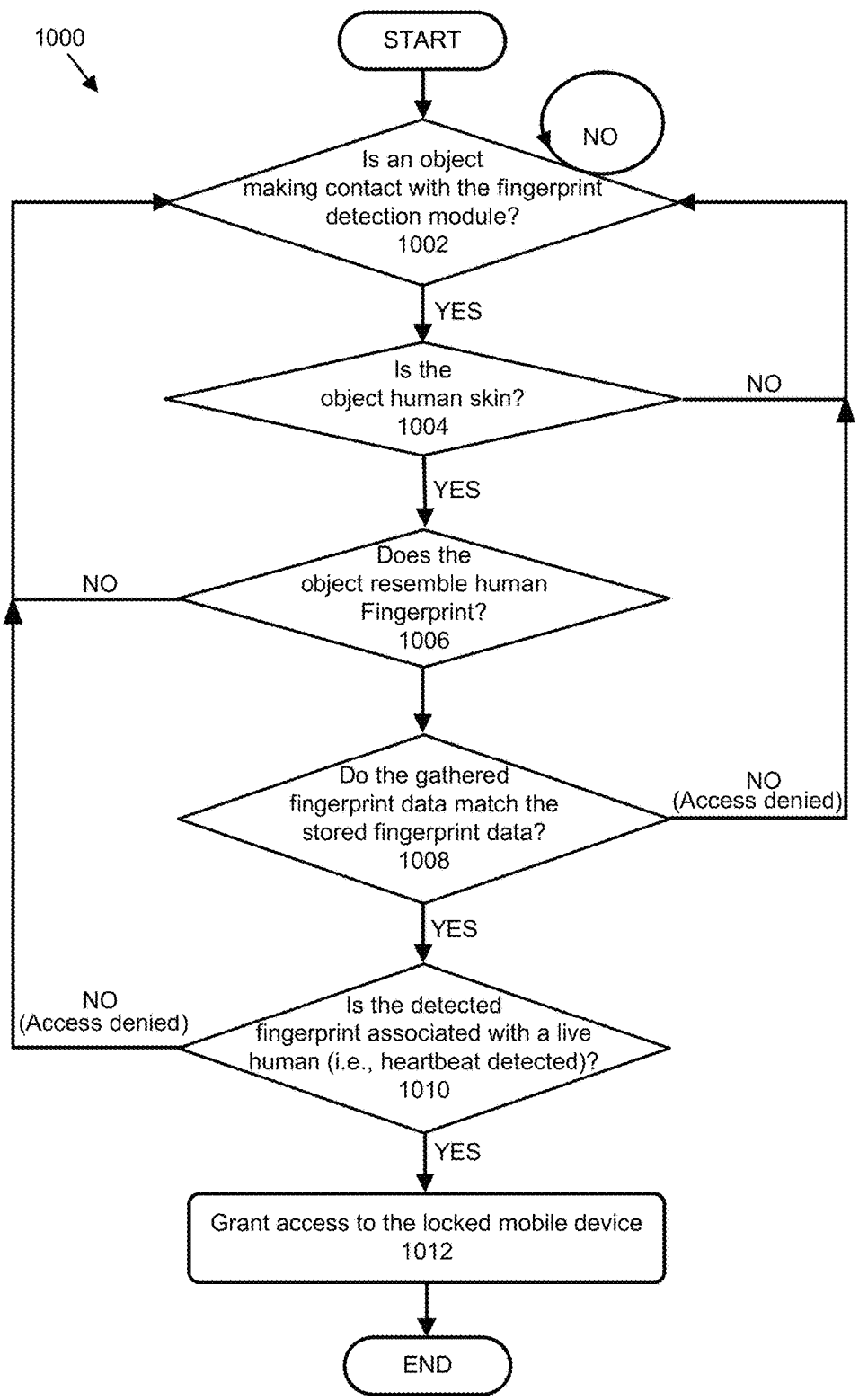
FIG. 10 presents a flowchart illustrating a process of using the fingerprint detection module to authenticate an access attempt to a locked mobile device through a highly secure procedure.

FIG. 10 presents a flowchart illustrating another exemplary process 1000 of authenticating user request to access a locked mobile device in a high security mode based on a combination of fingerprint detection and optical heartbeat detection.

A fingerprint detection module in a standby mode can continuously monitors for a contact from an object with the fingerprint detection module (1002). When the fingerprint detection module detects a contact from an object with the fingerprint detection module, the fingerprint detection module is used to determine whether the detected contact is from human skin (1004). In absence of contact from human skin, the fingerprint detection module returns to standby mode and continues to monitor for another contact (1002). When a contact from human skin is detected, the fingerprint detection module obtains data from the object making contact to determine whether the data from the object resembles human fingerprint (1006). In absence of fingerprint detection, the fingerprint detection module returns to standby mode and continues to monitor for the next contact (1002). When the detected contact is determined to be from human fingerprint, the main processing unit attempts to authenticate the obtained fingerprint data to determine whether the obtained fingerprint data match the stored fingerprint patterns of an authorized user of the mobile device (1008). When the obtained fingerprint data does not match with the stored fingerprint pattern of the authorized user of the mobile device, the fingerprint detection module returns to standby mode and continues to monitor for the next contact (1002). When the obtained fingerprint data match the stored fingerprint pattern of an authorized user of the mobile device, the fingerprint detection module determines whether the detected fingerprint of an authorized user of the mobile device is associated with a live human by detecting a presence of a heartbeat signal (1010). When the presence of a heartbeat signal is detect, the user request to access the locked mobile device is granted. When the presence of a heartbeat is not detected, the user request to access the locked mobile device is denied and the fingerprint detection module returns to standby mode and continues to wait for the next contact (1002). In various embodiments, the added verification of the heartbeat signal detection associated with the authorized user fingerprint detection at 1010 can be implemented as an optional process and the user request to access the locked mobile device can be granted or denied based solely on the detection of an authorized user's fingerprint at 1008. In some implementations, the user authentication process 1000 can directly obtain fingerprint data from the object making contact without one or both intermediate processes of identifying the detected contact as being from human skin (1004) and determining whether fingerprints can be found on the identified human skin (1006). In some other implementations, the heartbeat detection process (1010) may be performed after detecting a contact from an object (1002) but before determining whether fingerprint data of an authorized user can be detected on the human skin making contact with the touch sensor of the fingerprint detector (1008).

Figure 11A:
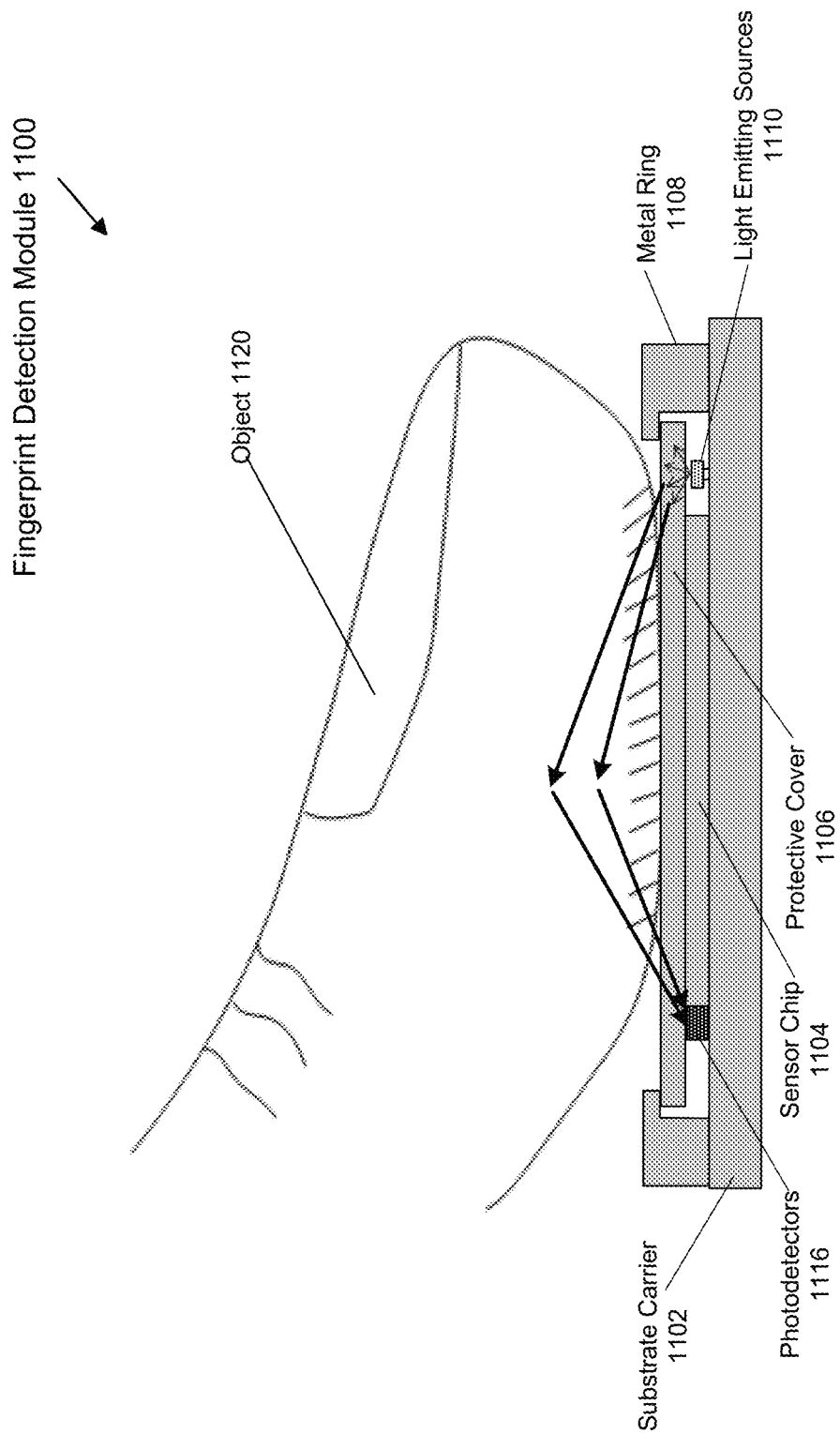
FIG. 11A illustrates a fingerprint detection module as a variation of fingerprint detection module for detecting and determining whether a detected object is human.

FIG. 11A illustrates an exemplary fingerprint detection module 1100 as a variation of fingerprint detection module 400 for determining whether a detected contact from an object is from human skin.

Similarly to fingerprint detection module 400, fingerprint detection module 1100 includes substrate carrier 1102, protective cover 1106, touch sensor such as a metal ring 1108 and sensor chip 1104, which may include a capacitive sense array for sensing a fingerprint's ridge and valley patterns. Also, fingerprint detection module 1100 includes one or more photodetectors 1116 which can either be integrated on sensor chip 1104 or separately placed on substrate carrier 1102. The touch sensor for detecting a contact from an object can be implemented using conductive material having a shape corresponding to the fingerprint detection module, such as a metal ring 1108 placed around and slightly above the protective cover to protect the border of the protective cover. The touch sensor can serve as a sensing electrode to detect a contact from an object 1120 with the fingerprint detection module 1100. In fingerprint detection module 1100, one or more light emitting sources 1110 are located directly under protective cover 1106 within a gap between protective cover 1106 and substrate carrier 1102 and close to an edge of sensor chip 1104. Thus, unlike the fingerprint detection module 400, the metal ring 1108 in fingerprint detection module 1100 does not include a cavity for housing the light emitting sources 1110. In some implementations, light emitting sources 1110 can emit at least two different wavelengths.

To allow detection light signals emitted from light emitting sources 1110 to pass through protective cover 1106 and reach object 1120, the protective cover 1106 is transparent to the detection lights. When protective cover 1106 is coated with a colored layer on the bottom surface to achieve a desired appearance, the colored layer can be opaque to the wavelengths of lights emitted by light emitting sources 1110, which are placed directly underneath the colored layer.

Figure 11B:
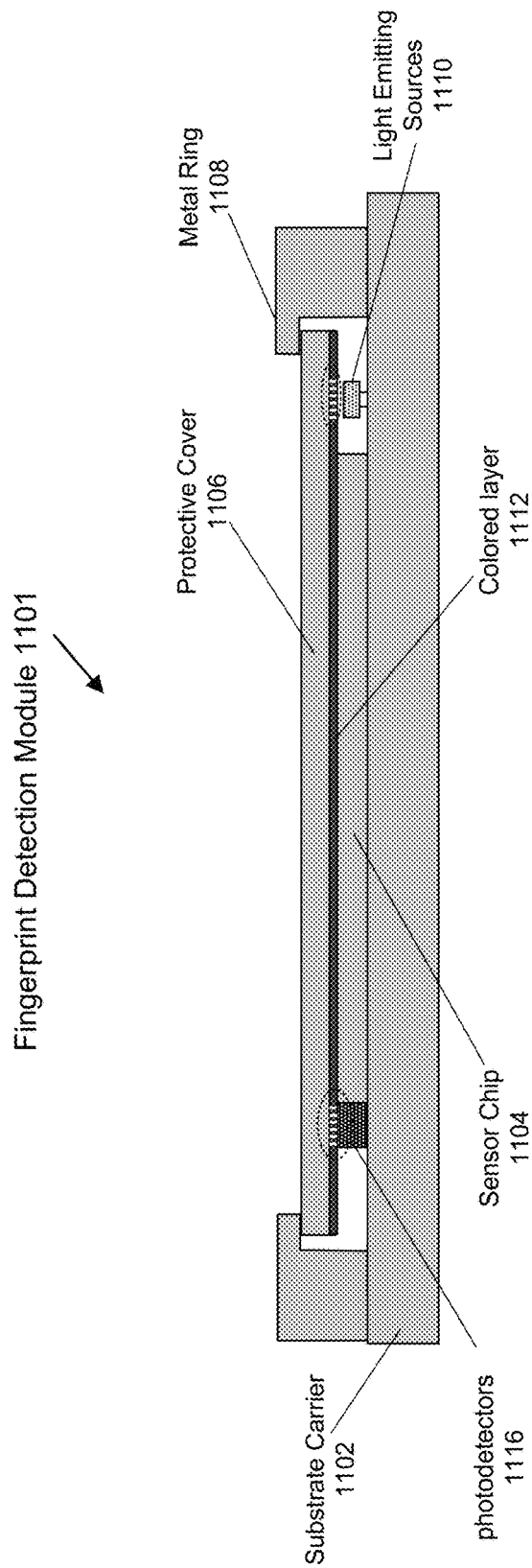
FIG. 11B illustrates a fingerprint detection module which includes a protective cover coated with a colored layer.

FIG. 11B illustrates an exemplary fingerprint detection module 1101 which includes a protective cover coated with a colored layer. As can be seen in FIG. 11B, fingerprint detection module 1101 includes substrate carrier 1102, sensor chip 1104, protective cover 1106, metal ring 1108, one or more light emitting sources 1110 located underneath protective cover 1106, and one or more photodetectors 1116. A colored layer 1112 is coated on the bottom surface of protective cover 1106 to provide the intended color appearance. The color layer 1112 is transparent to the light emitted from light emitting sources 1110 to allow the emitted light to pass through the colored layer 1112 and reach an object making contact with protective cover 1106. Moreover, the color layer 1112 is transparent to reflected light from the object making contact with the protective cover 1106 to reach photodetectors 1116 which is also located underneath colored layer 1112. In the embodiment shown in FIG. 11B, transparency to emitted light and reflected light is achieved using multiple micro-holes 1114 created through colored layer 1112 in the regions directly above light emitting sources 1110 and photodetectors 1116. These micro-holes 1114 can be sufficiently small so that they are not visible to a user but large enough to allow emitted light from light emitting sources 1110 to pass through and reach an object and reflected light from an object to pass though and reach photodetectors 1116. For example, the size of the multiple micro-holes can be from about 1 µm to a few µm. In some implementations, micro-holes 1114 are formed in the colored layer 1112 using a laser.

In various embodiments of a fingerprint detection module described in this patent document (i.e., fingerprint detection modules 100, 300, 400, 1100, and 1101), the fingerprint sensor chip in a respective fingerprint detection module can have a thickness between 200 µm to 500 µm. The substrate in a respective fingerprint detection module can have a thickness between 0.5 mm to 2 mm. The metal ring in a respective fingerprint detection module can have a thickness between 0.5 mm to 2 mm. The thickness of the protective cover in a respective fingerprint detection module can be between 100 µm to 500 µm. The protective cover, e.g., protective cover 106, can be made of entirely by a single material, e.g., sapphire, zirconia, or ceramic. However, in some implementations, a protective cover can be made of at least two layers: a top layer of a relatively hard and more expensive material of high dielectric-constant (e.g., sapphire, zirconia, or diamond-like carbon) and a bottom layer of relatively less expensive material of high dielectric-constant (e.g., a ceramic material such as aluminum nitride (AlN)). For example, if a protective cover has an overall thickness of 450 µm, the top layer can be made of 150 µm of sapphire and the bottom layer can be made of 300 µm AlN. Such double layer structure can lower the overall cost of the protective cover while maintaining sufficiently high hardness and dielectric strength.

Figure 12:
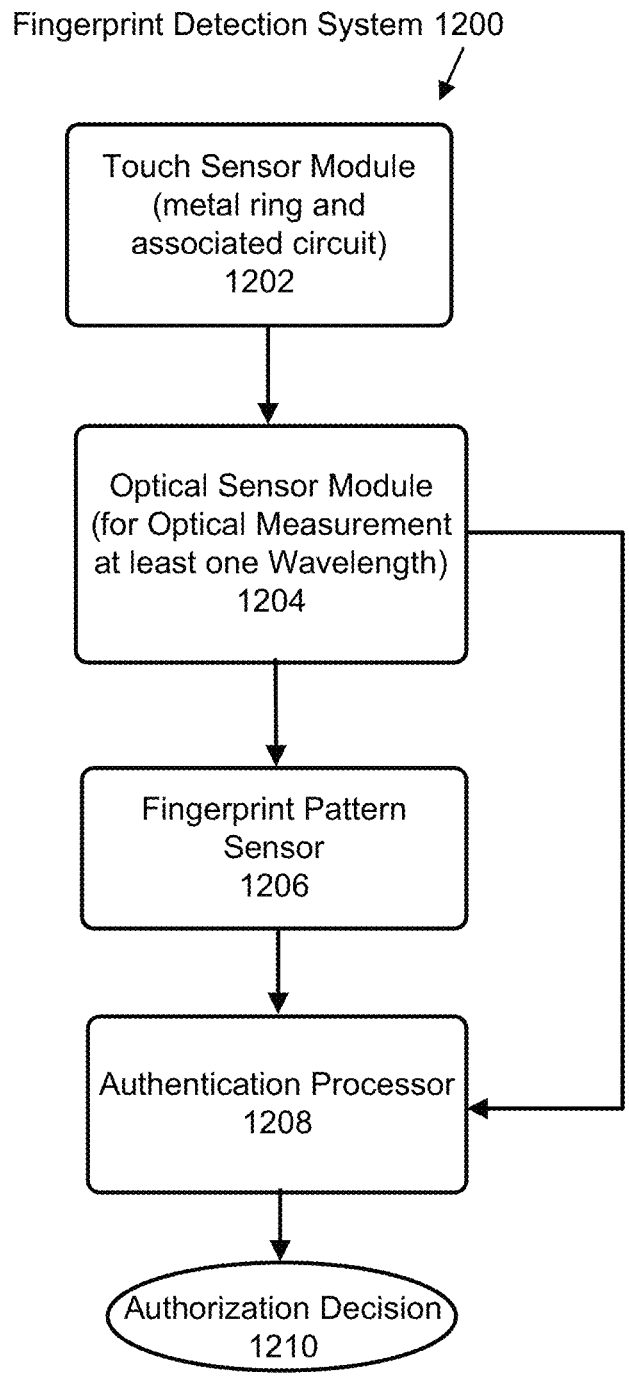
FIG. 12 presents a diagram of a fingerprint detection system for performing human fingerprint detection and authentication.

FIG. 12 presents a diagram of an exemplary fingerprint detection system 1200 for performing human fingerprint detection and authentication. As shown in FIG. 12, fingerprint detection system 1200 includes a touch sensing module 1202 which includes a touch sensor (such as a metal ring) and sensor circuitry for detecting a contact from an object with fingerprint detection system 1200. Also, fingerprint detection system 1200 includes an optical sensor module 1204, a fingerprint pattern sensor 1206, and an authentication processor 1208. Touch sensing module 1202 is communicatively coupled to optical sensor module 1204 to combine sensor data from touch and optical sensors. When touch sensing module 1202 detects a contact from an object, such as a finger, touch sensing module 1202 activates optical sensor module 1204 to perform fingerprint analysis. Optical sensor module 1204 produces probe light at two or more different optical wavelengths to which a person's skin produces different optical responses at the two or more different optical wavelengths due to presence of blood in the person's skin. An optical detection unit in the optical sensor module 1204 receives a reflection or transmission of the probe light from the object making contact to detect optical measurements that represent reactions of the reflected probe light at the two or more different optical wavelengths. The optical measurements of the reflected probe at different wavelengths can be used to compute values that are compared to standard or calibrated values for human blood absorption to determine whether the detected contact is from human skin. The computation, comparison, and determination of reflected probe light operations can be performed by an on-chip signal processing unit integrated with optical sensor module 1204.

Optical sensor module 1204 is communicatively coupled to fingerprint pattern sensor 1206. When optical sensor module 1204 detects human skin as the object making contact, optical sensor module 1204 activates fingerprint pattern sensor 1206. Fingerprint pattern sensor 1206 includes a sensor array which obtains fingerprint data and a fingerprint pattern processor that determines whether the obtained fingerprint data resembles a human fingerprint. Fingerprint pattern sensor 1206 is communicatively coupled to authentication processor 1208. When fingerprint pattern sensor 1206 detects a human fingerprint, fingerprint pattern sensor 1206 activates authentication processor 1208. Authentication processor 1208 receives the obtained fingerprint data from fingerprint pattern sensor 1206 and verifies whether the obtained fingerprint data matches stored fingerprint data of an authorized person's fingerprint pattern. Based on the verification outcome, the authentication processor generates authorization decision 1210 to determine whether the user request to access the locked mobile device is granted or denied.

In a high security operation mode, authentication processor 1208 can receive optical measurements at two or more optical wavelengths from optical sensor module 1204, and used the optical measurements to detect a presence of a human heartbeat signal. This heartbeat detection offers an additional layer of security on whether a live person is associated with the detected human fingerprint. The authentication processor 1208 then generates authorization decision 1210 based on both the result of fingerprint authentication and the result of heartbeat detection.

Figure 13A:
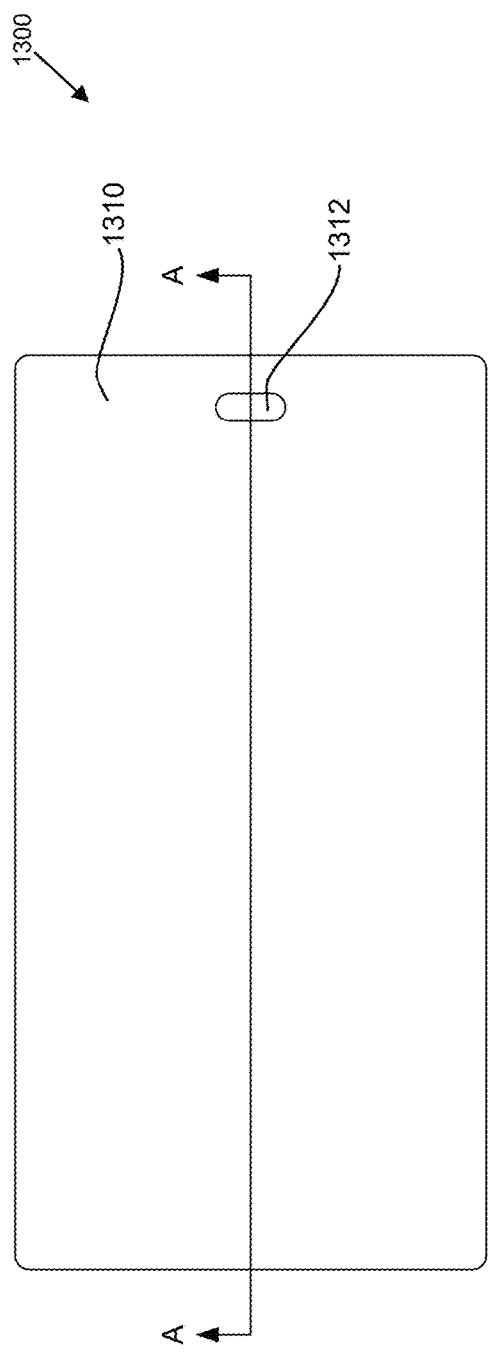
FIG. 13A is a top-down view of an exemplary mobile device showing a touch sensor assembly packaged under a display screen cover glass.
Figure 13B:
FIG. 13B is a cross sectional view of the mobile device cut along the line A-A.

FIG. 13A is a top-down view of an exemplary mobile device 1300 showing a touch sensor assembly packaged under a display screen cover glass. The mobile device 1300 includes a display screen cover glass 1310 with an exemplary thickness between 0.55-0.75 mm. The touch sensor assembly 1312 is packaged to be disposed under the display screen cover glass 1310. FIG. 13B is a cross sectional view of the mobile device 1300 cut along the line A-A. A cross-sectional view of the display screen cover glass 1310 is shown with a cross-sectional view of the touch sensor assembly section 1312 packaged or disposed under the display screen cover glass 1310.

Figure 13C:
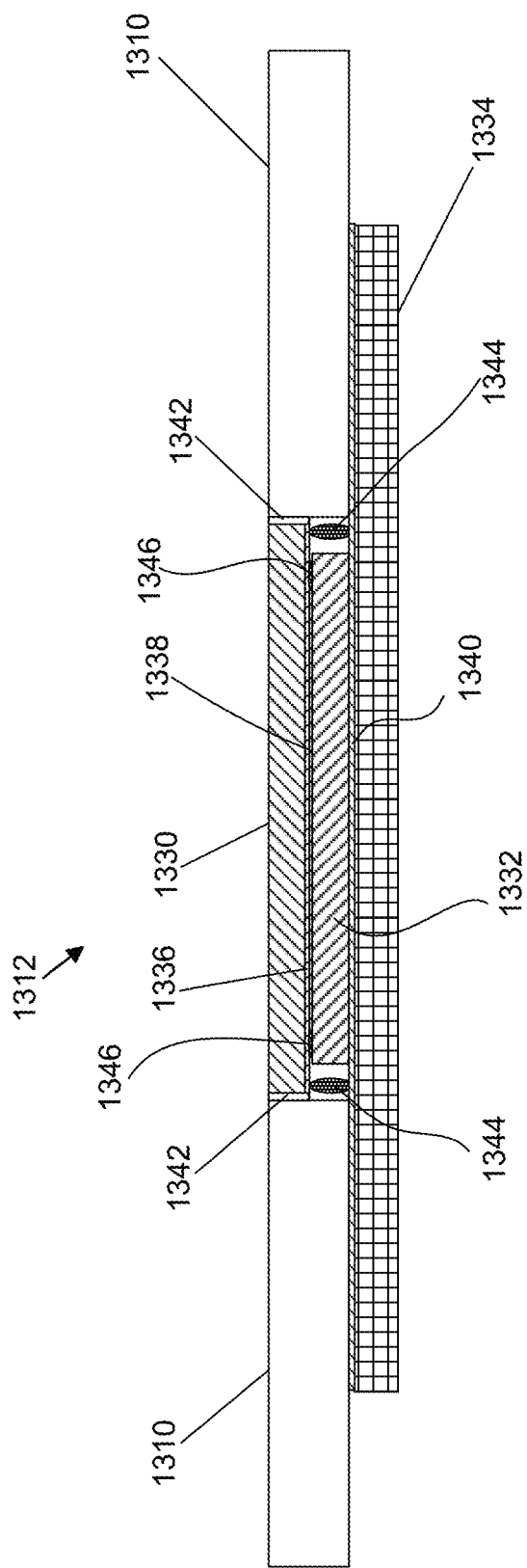
FIG. 13C shows a cross-sectional view of the touch sensor assembly shown in FIGS. 13A and 13B packaged to be under or flush with the display screen cover glass 1310.

FIG. 13C shows a cross-sectional view of the touch sensor assembly 1312 shown in FIGS. 13A and 13B packaged to be under or flush with the display screen cover glass 1310. The display screen cover glass 1310 can have a thickness between 0.55-0.75 mm. The touch sensor assembly 1312 includes a sensor chip 1332 with an exemplary thickness of 0.25 mm. The sensor chip 1332 is disposed over a printed circuit board (PCB) 1334 having an exemplary thickness between 0.3-0.5 mm. A filling material, such as epoxy etc. 1340 can be disposed between the sensor chip 1332 and the PCB 1334 to attach the sensor chip 1332 to the PCB 1334. A sensor cover glass 1330 with an exemplary thickness of between 0.1-0.3 mm can be disposed over the sensor chip 1332. The sensor cover glass 1330 can incorporate a desired color to achieve a desired visual appearance. A flexible printed circuit (FPC) connector 1336 can be glued onto the sensor cover glass 1330 between the sensor cover glass 1330 and the sensor chip 1332. The sensor cover glass 1330 can have an exemplary thickness of approximately 0.03 mm. In addition a filling material 1338, such as epoxy etc. can be disposed between the FPC connector 1336 and the sensor chip 1332. A metal layer 1342 can be bound to each side of the sensor cover glass 1330 and connected to the TX of the sensor chip 1330. One or more compressed solder balls 1346 can be disposed on the edges of the sensor chip 1332 between the FPC connector 1336 and the sensor chip 1332. One or more solder balls 1344 can be disposed between the FPC connector 1336 and the filling material, such as epoxy etc. 1340 disposed over the PCB 1334.

The packaging of the touch sensor assembly shown in FIGS. 13A, 13B and 13C can be applied to fingerprint detection modules 100, 300, 400, 1100 and 1101 in addition to mobile devices 800 and 820.

In one aspect, a fingerprint detection module includes a substrate carrier and a fingerprint sensor chip located on the substrate carrier for collecting fingerprint data. The fingerprint detection module also includes one or more light emitting sources located on the substrate carrier and configured to emit detection light comprising at least one wavelength. The fingerprint detection module additionally includes at least one photodetection element located on the substrate carrier and configured to receive and detect at least a portion of the detection light which is reflected off of an object making contact with the fingerprint sensor module. The at least one photodetection element generates output signals in response to the detected light, wherein the output signals are used to determine if the object is human.

In some implementations, the at least one photodetection element is integrated on the fingerprint sensor chip. For example, the at least one photodetection element can be located at an edge of the fingerprint sensor chip. In some other implementations, the at least one photodetection element is separated from the fingerprint sensor chip and located on a different area of the substrate carrier.

In some implementations, the one or more light emitting sources include one or more light emitting diode (LED) chips. The one or more light emitting sources can emit the detection light in response to the detection that an object is making contact with the fingerprint sensor module. Moreover, the at least one photodetection element can be configured to detect a portion of the detection light which passes through the object making contact with the fingerprint sensor module, wherein the detected light can be used to determine a light absorption property of the object. The one or more light emitting sources can be modulated light sources.

In some implementations, the fingerprint sensor chip includes a pixelated sensing element array and a signal processing unit for processing the collected fingerprint data. The signal processing unit can be configured to process two output signals generated by the at least one photodetection element corresponding to the at least one wavelength of light. For example, the signal processing unit can compute a ratio of the two output signals and compare the computed ratio with a predetermined value calibrated for a human finger or human skin to determine if the object is human.

In some implementations, the fingerprint detection module additionally includes a protective cover placed over the fingerprint sensor chip to protect the fingerprint sensor chip and a metal ring placed around and slightly above the protective cover to protect the border of the protective cover. The one or more light emitting sources can be placed inside a cavity within the metal ring, and to emit the detection light through one or more windows located at the top of the metal ring. Furthermore, the metal ring can serve as a sensing electrode to detect if the object is making contact with the fingerprint sensor module.

In some implementations, the substrate carrier can have a thickness between 0.5 mm to 2 mm. The fingerprint sensor chip can have a thickness between 200 $\mu$m to 500 $\mu$m. The protective cover chip can have a thickness between 100 $\mu$m to 500 $\mu$m. The metal ring can have a thickness between 0.5 mm to 2 mm.

In another aspect, a fingerprint sensor module includes a substrate carrier and a fingerprint sensor chip located on the substrate carrier for collecting fingerprint data. The fingerprint sensor module also includes a protective cover placed over the fingerprint sensor chip to protect the fingerprint sensor chip. The fingerprint sensor module additionally includes a high dielectric-constant layer sandwiched between the protective cover and the fingerprint sensor chip to separate the protective cover and the fingerprint sensor chip. Moreover, at least one edge of the fingerprint sensor chip is extended beyond the boundary of the high dielectric-constant layer to create a space between the protective cover and the fingerprint sensor chip for wire-bonding the fingerprint sensor chip.

In some implementations, the high dielectric-constant layer is made of a ceramic material having a dielectric constant greater than 8. For example, the high dielectric-constant layer can be made of a ceramic material having a dielectric constant between 20 to 30. The thickness of the high dielectric-constant layer can be greater than 100 μm.

In another aspect, a fingerprint sensor module includes a substrate carrier and a fingerprint sensor chip located on the substrate carrier for collecting fingerprint data. The fingerprint sensor module also includes a protective cover placed over the fingerprint sensor chip to protect the fingerprint sensor chip, wherein at least one edge of the fingerprint sensor chip is extended beyond the border of the protective cover to allow wire-bonding directly over the at least one edge of the fingerprint sensor chip without getting interference from the protective cover.

In yet another aspect, a fingerprint sensor module includes a substrate carrier and a fingerprint sensor chip located on the substrate carrier for collecting fingerprint data. The fingerprint sensor module also includes a protective cover placed over the fingerprint sensor chip to protect the fingerprint sensor chip, wherein the protective cover comprises at least two layers: a top layer made of a hard and more expensive material of high dielectric-constant and a bottom layer made of a less expensive material of high dielectric-constant. The top layer can be significantly thinner than the bottom layer.

In yet another aspect, a fingerprint detection module includes a substrate carrier and a fingerprint sensor chip located on the substrate carrier for collecting fingerprint data. The fingerprint detection module also includes one or more light emitting sources located on the substrate carrier and configured to emit detection light comprising at least one wavelength. The fingerprint detection module additionally includes at least one photodetection element located on the substrate carrier and configured to detect at least a portion of the detection light which is reflected off of an object making contact with the fingerprint sensor module, wherein output signals from the at least one photodetection element in response to the detected light are used to determine if the object is human. The fingerprint detection module further includes a protective cover placed over the fingerprint sensor chip to protect the fingerprint sensor chip. Moreover, the fingerprint detection module includes a high dielectric-constant layer sandwiched between the protective cover and the fingerprint sensor chip to separate the protective cover and the fingerprint sensor chip, wherein at least one edge of the fingerprint sensor chip is extended beyond the boundary of the high dielectric-constant layer to create a space between the protective cover and the fingerprint sensor chip for wire-bonding the fingerprint sensor chip.

In yet another aspect, a method for determining if an object making contact with a fingerprint detection module is human is described. The method includes the steps of: in response to the detection of an object is making contact with the fingerprint detection module, emitting detection light of at least two selected wavelengths using one or more light emitting sources within the fingerprint detection module; detecting at least a portion of the detection light which is reflected off of the object making contact with the fingerprint sensor module using at least one photodetection element within the fingerprint detection module; processing the output signals from the at least one photodetection element corresponding to the two selected wavelengths; and determining whether the detected object is human by comparing a signal ratio corresponding to the two selected wavelengths with a predetermined value of the same signal ratio calibrated from a human.

Various examples of fingerprint detection modules and fingerprint sensor modules described in this patent document can be integrated with mobile devices (e.g., smartphones, tablets, laptops), computing devices (e.g., personal computers), and other electronic devices to perform fingerprint authentication processes on these devices.

Techniques, systems, and devices are disclosed for performing human fingerprint detection and authentication using an optical detection module in addition to a fingerprint pattern recognition sensor. The disclosed human fingerprint detection and authentication technology can be integrated with mobile devices (e.g., smartphones and tablets) and other devices (e.g., such as computer monitors) to improve the fingerprint authentication technology used in existing devices.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A fingerprint detection module, comprising:
   a printed circuit board;
   a fingerprint sensor chip disposed over the printed circuit board and configured to collect fingerprint data;
   a protective layer disposed over the fingerprint sensor chip to protect the fingerprint sensor chip;
   a touch sensor disposed substantially next to the protective layer to detect a contact from an object making contact with the fingerprint detection module; and
   an optical detection module that includes:

one or more light emitting sources located on a substrate carrier and underneath the protective layer;

at least one photodetection element integrated with the fingerprint sensor chip and underneath the protective layer; and a signal processing circuit integrated with the fingerprint sensor chip.

2. The fingerprint detection module of claim 1, wherein the touch sensor comprises a conductive electrode.

3. The fingerprint detection module of claim 1, further comprising touch sensing circuitry communicatively coupled to the touch sensor to detect a signal indicative of the object in contact with the touch sensor.

4. The fingerprint detection module of claim 3, wherein the touch sensing circuitry is configured to detect a contact from the object by detecting an increase in a capacitive load coupled to the conductive electrode.

5. The fingerprint detection module of claim 4, further comprising detection circuitry integrated with the fingerprint sensor chip to detect a presence of fingerprint data from the object.

6. The fingerprint detection module of claim 1, further comprising a colored layer coated on the bottom surface of the protective cover, wherein the colored layer contains micro-holes in a first region directly above the one or more light emitting sources and a second region directly above the at least one photodetection element to allow light to pass through the colored layer in the first region and the second region.

7. The fingerprint detection module of claim 1, further comprising a colored layer coated on the bottom surface of the protective layer, wherein the colored layer is transparent with a nonvisual wavelength light in a first region directly above the one or more light emitting sources and a second region directly above the at least one photodetection element to allow certainly wavelength light to pass through the colored layer in the first region and the second region.

8. The fingerprint detection module of claim 1, wherein the one or more light emitting sources are configured to emit detection light comprising at least one wavelength; and wherein the at least one photodetection element are configured to receive and detect at least a portion of the detection light which is reflected off of an object making contact with the fingerprint detection module.

9. The fingerprint detection module of claim 8, wherein output signals from the at least one photodetection element in response to the detected light are used to determine one or both of:

whether the detected contact from the object is from human skin; and whether a presence of a heart beat is detected from the object.

10. The fingerprint detection module of claim 1, wherein the module is configured to combine the collected fingerprint data from the fingerprint sensor chip and the detected contact from the touch sensor to deny a person's access when the collected fingerprint data matches stored fingerprint data of an authorized user's fingerprint pattern while the detected contact fails to indicate the contact is from a live person.

11. The fingerprint detection module of claim 1, further including:

an authentication processor coupled to the fingerprint sensor chip and the touch sensor and is configured to combine the collected fingerprint data from the fingerprint sensor chip and the detected contact from the touch sensor to authenticate a person when the collected fingerprint data matches stored fingerprint data of an authorized user's fingerprint pattern and the detected contact indicates the contact is from a live person.

12. A fingerprint detection module, comprising:

a touch sensor including a metal ring configured to detect a contact from an object making contact with the fingerprint detection module;

a fingerprint pattern sensor that includes a sensor array configured to read a fingerprint pattern and a fingerprint pattern processor configured to determine whether the read fingerprint pattern matches stored information of an authorized user's fingerprint pattern to provide a fingerprint pattern authentication output;

an optical sensor module that produces probe light at one or more optical wavelengths to which the user's skin produces different optical responses at the one or more optical wavelengths due to presence of blood under the skin, the optical sensor module including an optical detection unit configured to receive a reflection or transmission of the probe light to produce optical measurements of the probe light at the one or more different optical wavelengths; and an authentication processor configured to receive the fingerprint pattern authentication output from the fingerprint pattern sensor and the optical measurements of the probe light at the one or more different optical wavelengths from the optical sensor module and to combine both the fingerprint pattern authentication output and optical measurements of the probe light to determine whether an access is to be granted or denied.

13. The fingerprint detection module of claim 12, wherein:

the authentication processor is configured to combine the collected fingerprint data from the fingerprint sensor chip and the detected contact from the touch sensor to authenticate a person when the collected fingerprint data matches stored fingerprint data of an authorized user's fingerprint pattern and the detected contact indicates the contact is from a live person, and to deny a person's access when the collected fingerprint data matches stored fingerprint data of an authorized user's fingerprint pattern while the detected contact fails to indicate the contact is from a live person.

14. The fingerprint detection module of claim 1, wherein the touch sensor includes a metal ring configured to detect the contact.

15. The fingerprint detection module of claim 1, further comprising:

a fingerprint pattern sensor that includes a sensor array configured to read a fingerprint pattern and a fingerprint pattern processor configured to determine whether the read fingerprint pattern matches stored information of an authorized user's fingerprint pattern to provide a fingerprint pattern authentication output.

16. The fingerprint detection module of claim 15, further comprising:

an authentication processor configured to receive the fingerprint pattern authentication output from the fingerprint pattern sensor and the optical measurements of the probe light at the one or more different optical wavelengths from the optical sensor module and to combine both the fingerprint pattern authentication output and optical measurements of the probe light to determine whether an access is to be granted or denied.

17. The fingerprint detection module of claim 1, further comprising:
    an optical sensor module that produces probe light at one or more optical wavelengths to which the user's skin produces different optical responses at the one or more optical wavelengths due to presence of blood under the skin, the optical sensor module including an optical detection unit configured to receive a reflection or transmission of the probe light to produce optical measurements of the probe light at the one or more different optical wavelengths.

* * * * *